United States Patent
Adetunji et al.

(10) Patent No.: US 10,800,907 B2
(45) Date of Patent: Oct. 13, 2020

(54) PROCESS FOR PREPARATION OF POLYETHYLENE NANOCOMPOSITE

(71) Applicant: QENOS PTY LTD, Altona, Victoria (AU)

(72) Inventors: Philip Adetunji, Burwood East (AU); Minoo Naebe, Highton (AU); Paul Frigo, Hillside (AU); Brian Egan, Altona (AU)

(73) Assignee: QENOS PTY LTD, Altona, Victoria (AU)

( * ) Notice: Subject to any disclaimer, the term of this patent is extended or adjusted under 35 U.S.C. 154(b) by 131 days.

(21) Appl. No.: 16/067,432

(22) PCT Filed: Jan. 13, 2017

(86) PCT No.: PCT/AU2017/050023
§ 371 (c)(1),
(2) Date: Jun. 29, 2018

(87) PCT Pub. No.: WO2017/120642
PCT Pub. Date: Jul. 20, 2017

(65) Prior Publication Data
US 2019/0010316 A1 Jan. 10, 2019

(30) Foreign Application Priority Data
Jan. 15, 2016 (AU) ................................ 2016900120

(51) Int. Cl.
*C08L 23/06* (2006.01)
*C08K 3/04* (2006.01)
*C08F 110/02* (2006.01)
*B82Y 30/00* (2011.01)
*C01B 32/225* (2017.01)

(52) U.S. Cl.
CPC ............ *C08L 23/06* (2013.01); *C08F 110/02* (2013.01); *C08K 3/04* (2013.01); *C08K 3/042* (2017.05); *B82Y 30/00* (2013.01); *C01B 32/225* (2017.08); *C08F 2500/07* (2013.01); *C08F 2500/12* (2013.01); *C08K 2201/011* (2013.01); *C08L 2203/18* (2013.01); *C08L 2207/062* (2013.01)

(58) Field of Classification Search
CPC .............................. C08L 23/06; C08K 3/042
See application file for complete search history.

(56) References Cited

FOREIGN PATENT DOCUMENTS

| | | |
|---|---|---|
| CN | 104327357 A | 2/2015 |
| CN | 104356481 A | 2/2015 |
| CN | 104497385 A | 4/2015 |
| CN | 104650438 A | 5/2015 |
| WO | 2013/053944 A1 | 4/2013 |
| WO | 2014/144139 A1 | 9/2014 |
| WO | 2016/005504 A1 | 1/2016 |

OTHER PUBLICATIONS

Xu et al (What is the choice for supercapacitors: graphene or graphene oxide? Energy & Environmental Science, 2011, 4, 2826) (Year: 2011).*
PCT International Search Report and Written Opinion for corresponding PCT/AU2017/050023, dated Feb. 13, 2017.
PCT International Preliminary Report on Patentability Chapter II for corresponding PCT/AU2017/050023, dated Feb. 22, 2018 (with attached annex, 6 pp., dated Jan. 29, 2018).
Chaudhry et al., "High-Density Polyethylene Nanocomposites Using Masterbatches of Chlorinated Polyethylene/Graphene Oxide," Polymer Engineering and Science 53:78-88 (2013).
Australian International—Type Search Report and Written Opinion for Australian National Application No. 2016900120, (dated Jun. 17, 2016).

* cited by examiner

*Primary Examiner* — Wenwen Cai
(74) *Attorney, Agent, or Firm* — Troutman Pepper Hamilton Sanders LLP (Rochester)

(57) ABSTRACT

The invention provides a process for preparation of a polyethylene nanocomposite comprising dispersing a base polyethylene resin and planar carbon nanoparticles in an inert liquid at conditions under which the base polyethylene resin is not solubilised in the inert liquid, and removing an amount of the liquid sufficient to provide a dispersion of the planar carbon nanoparticles in the base polyethylene resin.

20 Claims, 3 Drawing Sheets a) PE100　　　　b) carbon black　　　c) xGnP2
(10g)　　　　　　(0.2g)　　　　　　　(0.2g)

PROCESS FOR PREPARATION OF POLYETHYLENE NANOCOMPOSITE

This application is a national stage application under 35 U.S.C. § 371 of PCT Application No. PCT/AU2017/050023, filed Jan. 13, 2017, which claims priority of Australia Patent Application No. 2016900120, filed Jan. 15, 2016.

TECHNICAL FIELD

The present invention relates to a process for preparing a polyethylene nanocomposite. In particular, the present invention relates to a process for preparing a polyethylene nanocomposite for manufacture of a pipe having high resistance to internal pressure, the polyethylene nanocomposite having acceptable resistance to slow crack growth and impact properties and comprising planar carbon nanoparticles and a base polyethylene resin. The present invention also relates to a polymer nanocomposite produced by such a process, and to an extruded pipe formed from a polymer nanocomposite produced by such a process.

BACKGROUND OF INVENTION

Polyethylene (PE) resin has been used for the manufacture of pipes for the transport of fluids such as gases and liquids since the 1970's. The widespread use of polyethylene in pipe applications is due to the lightweight properties, strength, flexibility and chemical stability of the polyethylene material.

High performance polyethylene resins such as PE80 and PE100 resin have been developed for the production of pipes with improved resistance to slow crack growth and rapid crack propagation. Accordingly, such polyethylene resins can be used in the formation of pipes where high strength is required, such as in pipes that are pressurised during normal use. However, while PE80 and PE100 resins possess a number of favourable mechanical and physical properties, there remains a need to develop new polymer materials with improved physical properties that are capable of forming pipes having one or more improved properties or can be used with greater economy in preparing pipe.

A stronger PE material, with a Minimum Required Strength (MRS) of 11.2 MPa (PE112), 12.0 MPa (PE120) or 12.5 MPa (PE125) would be very desirable for fabricating pressure pipes. In general it has been found that attempts to prepare PE materials for pressure pipes with higher resistance to internal pressure have led to other properties, particularly toughness, processability and slow crack growth, being significantly reduced. For example, commercially available PE compositions for pipe have been prepared to optimise MRS to 11.2 MPa, but pipes fabricated from these materials have been susceptible to brittle failures in high operating pressure service, particularly at temperatures of 60° C. and 80° C.

In other instances, the addition of particulate matter such as mineral fillers to polyethylene to improve strength and load bearing performance have typically culminated in severe degradation of the toughness, resistance to slow crack growth and ductility of the composite. Moreover, it has previously proved challenging to obtain satisfactorily uniform dispersions of high surface area fillers in polyolefins such as polyethylene. High surface area materials generally have a very low bulk density. Therefore, even when the filler is a minor component of a polyethylene composite, the total dry volume of the high surface area filler may be large relative to the volume of polyolefin into which it must be dispersed. This may represent a particularly acute issue when conventional dispersion techniques such as melt blending are employed.

A reference herein to a patent document or other matter which is given as prior art is not to be taken as an admission that the document or matter was known or that the information it contains was part of the common general knowledge as at the priority date of any of the claims.

SUMMARY OF INVENTION

We have found a process for dispersing certain particles, specifically planar carbon nanoparticles, into a base polyethylene resin that allows preparation of pipe such that a significant increase in resistance to internal pressure may be realised without unduly compromising the minimum requirements for properties such as toughness, processability and resistance to slow crack growth. The process provides an improved means to disperse planar carbon nanoparticles, which have very low bulk density, into a base polyethylene resin, thereby providing a uniform distribution of nanoparticles. The process of the invention may be implemented using readily available equipment, and the composition produced by the process has a bulk density that is not unacceptably reduced compared to that of the base polyethylene resin, such that it may be subsequently processed using conventional melt-processing procedures and equipment.

The process in accordance with the invention involves dispersing a base polyethylene resin and planar carbon nanoparticles in an inert liquid at conditions under which the base polyethylene resin is not solubilised in the inert liquid, and removing an amount of the liquid sufficient to provide a dispersion of the planar carbon nanoparticles in the base polyethylene resin.

In accordance with one aspect the invention provides a process for preparation of a polyethylene nanocomposite comprising:
    providing a base polyethylene resin in the form of a particulate solid,
    providing planar carbon nanoparticles,
    dispersing each of the base polyethylene resin and the planar carbon nanoparticles in an inert liquid at conditions under which the base polyethylene resin is not solubilised in the inert liquid, and
    removing a sufficient amount of the liquid to provide a dispersion of the planar carbon nanoparticles in the base polyethylene resin.

Preferably the sufficient amount of the liquid is removed while maintaining a dispersion of the base resin and planar carbon nanoparticles in the liquid.

In one set of embodiments, the planar carbon nanoparticles are selected from the group consisting of graphene, graphite, exfoliated graphite nanoparticles, reduced graphene oxide and mixtures thereof.

We have found the process to be particularly advantageous in preparing high performance polyethylene compositions having an MRS of at least 10 MPa, or at least 11.2 MPa, or at least 12 MPa or at least 12.5 MPa. In such applications the formation of nanocomposites comprising planar carbon nanoparticles of high surface area presents a significant problem in effectively dispersing the nanoparticles, which are of very low bulk density and hence relatively large volume, in a resin of relatively small volume. The nanoparticles tend to agglomerate or occlude air which is detrimental to the nanocomposite properties, particularly MRS and resistance to slow crack growth, unless significant effort is made to eliminate these problems during melt compounding.

Accordingly in one set of embodiments of the process, the base polyethylene resin has a melt flow index in the range of from 0.10 to 0.9 g/10 min at 190° C. and 5 kg as measured according to ISO 1133, high load melt flow index of from 2 to 20 g/10 min at 190° C. and 21.6 kg as measured according to ISO 1133, a density in the range of from about 0.930 to about 0.970 g/cm$^3$ at 23° C. as measured according to ASTM D792, and preferably a slow crack growth resistance of at least 1000 hours when measured according to ASTM F1473-97 at 80° C. in air, 2.4 MPa tensile stress and a notch depth of 3.5 mm; and the planar carbon nanoparticles have a BET (from Brunauer-Emmett-Teller (BET) theory) surface area of at least 100 m$^2$/g (preferably at least 200 m$^2$/g, still more preferably at least 400 m$^2$/g and most preferably from 400 m$^2$/g to 1000 m$^2$/g) in an amount of from 0.1% to 70% (such as 0.1 to 20% or 5% to 70%) by weight based on the weight of the polyethylene nanocomposite composition.

In one set of embodiments, the process further comprises melt compounding the dispersion of the planar carbon nanoparticles in the base polyethylene resin to produce a melt compounded nanocomposite.

In one set of embodiments of the process, the sufficient amount of the inert liquid removed to provide a dispersion of the planar carbon nanoparticles in the base polyethylene resin is removed at conditions under which the base polyethylene resin is not solubilised in the inert liquid.

In one set of embodiments of the process, the inert liquid is a liquid in which the base polyethylene resin is insoluble.

In accordance with another aspect of the invention, there is provided a polyethylene nanocomposite prepared by the process of any one of the embodiments described herein.

In accordance with a further aspect of the present invention, there is provided an extruded pipe formed from the polyethylene nanocomposite prepared by the process of any one of the embodiments described herein.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
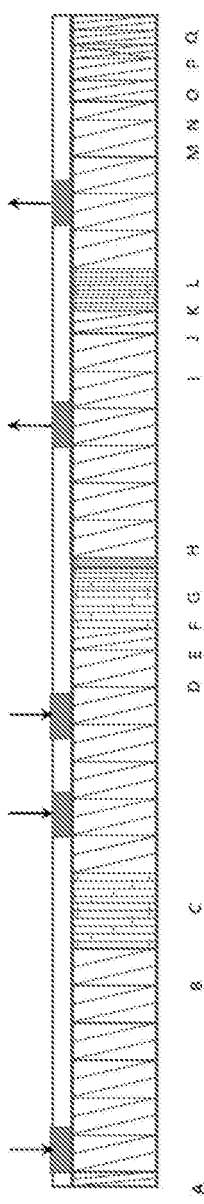
FIG. 1 is a schematic of the screw configuration of the twin screw compounder used to melt compound a nanocomposite prepared by the process of the invention.

The present invention relates to a process for preparation of a polyethylene resin composition comprising planar carbon nanoparticles. As used herein, planar carbon nanoparticles have a planar morphology (such as nanosheets and the like), consist predominantly of elemental carbon and have at least one dimension in the nanometre range, i.e. less than 100 nm. The planar carbon nanoparticles are thus to be distinguished from non-planar carbon nanoparticles (such as carbon nanotubes, nanowires and the like), from planar carbon oxide nanoparticles (such as graphene oxide and the like) and from carbon particles lacking at least one nanoscale dimension. The polyethylene resin composition produced by the process of the invention is also referred to herein as a nanocomposite. As used herein, the term "nanocomposite" denotes a composition comprising a mixture of planar carbon nanoparticles and a base polyethylene resin.

The inventors have found that the incorporation of planar carbon nanoparticles into a base polyethylene resin, by employing the process of the invention, allows one or more properties of the base polyethylene resin to be improved or enhanced. The inventors have also found that the planar carbon nanoparticles, which generally have very low bulk density, may be conveniently dispersed into a base polyethylene resin with the process of the invention, thereby providing a uniform distribution of nanoparticles in the nanocomposite. Furthermore, the inventors have found that the composition produced by the process of the invention has a similar, or not unacceptably reduced, bulk density compared to that of the base polyethylene resin provided in the process, and may thus be subsequently processed on similar or identical equipment without substantial or unacceptable loss of throughput.

A base polyethylene resin in the form of a particulate solid is provided in the process. As used herein the term "base polyethylene resin" refers to a polyethylene polymer resin that does not contain planar carbon nanoparticles. As used herein, a "particulate solid" is a material consisting of a plurality of discrete solid particles. The base polyethylene resin preferably has an MPS$_{95}$ less than 2000 micrometers. As used herein, the MPS$_{95}$ of a particulate solid is the maximum particle size for those 95.0 volume % of the particles which have the smallest particles sizes, i.e. 95.0 volume % of the material is found in particles with a size equal to or smaller than MPS$_{95}$. Preferably, the base polyethylene resin has an MPS$_{95}$ less than 1500 micrometers, or less than 1000 micrometers.

Planar carbon nanoparticles are also provided in the process of the invention. The planar carbon nanoparticles employed in the nanocomposite prepared by the process of the invention are generally in particle form and have at least one dimension in the nanometre range, i.e. less than 100 nm. In one set of embodiments, the planar carbon nanoparticles provided in the process is selected from the group consisting of graphene, graphite, exfoliated graphite, and mixtures thereof.

The base polyethylene resin and the planar carbon nanoparticles are each dispersed in an inert liquid. By this it is meant that the particles of the base polyethylene resin and the planar carbon nanoparticles and the liquid are sufficiently dispersed within the liquid so that the planar carbon nanoparticles are distributed throughout the base polyethylene resin upon removal of the sufficient amount of the liquid. It is preferred that the particles of the base polyethylene resin and the planar carbon nanoparticles are dispersed substantially homogeneously throughout the volume of the liquid. As used herein, the term "inert" in relation to a liquid means that the liquid does not react with the base polyethylene resin in a manner deleterious to the polymer properties.

The dispersion in the liquid takes place at conditions under which the base polyethylene resin is not solubilised in the inert liquid. By this it is meant that the conditions, including the temperature, are selected such that the base polyethylene resin does not become dissolved in the liquid while dispersing the base polyethylene resin and the planar carbon nanoparticles in the liquid before removing the sufficient amount of liquid.

A sufficient amount of the liquid is removed, preferably while maintaining a dispersion of the base resin and planar carbon nanoparticles in the liquid, to provide a dispersion of the planar carbon nanoparticles in the base polyethylene resin. As used herein, a "dispersion of the planar carbon nanoparticles in the base polyethylene resin" means a composition in which the planar carbon nanoparticles are distributed throughout a matrix of the base polyethylene resin. Preferably, the planar carbon nanoparticles are distributed substantially homogeneously throughout the base polyethylene resin matrix. Preferably, the dispersion of the planar carbon nanoparticles in the base polyethylene resin is stable, meaning that a dispersed distribution of planar carbon nanoparticles throughout the base polyethylene resin is maintained without the need for continued intervention.

The Inert Liquid

In some embodiments, the inert liquid is a liquid which does not solubilise the base polyethylene resin at temperatures below the boiling point of the liquid. In some embodiments, the inert liquid is a liquid which does not solubilise the base polyethylene resin at temperatures below the melting point of the base polyethylene resin. In some embodiments, the inert liquid is a liquid which does not solubilise the base polyethylene resin at temperatures below 150° C. In some embodiments, the inert liquid is a liquid in which the base polyethylene resin is insoluble. As used herein, the phrase "a liquid in which the base polyethylene is insoluble" refers to a liquid in which the base polyethylene resin cannot be solubilised at temperatures below 170° C. Preferably, the liquid is a liquid in which the base polyethylene resin cannot be solubilised at temperatures below 200° C., more preferably below 230° C. Liquids which are poor solvents or non-solvents for polyethylene are preferred, as these liquids are less likely to swell or cause agglomeration of the particles of the base polyethylene resin during the process of the invention.

In some embodiments, the inert liquid has a boiling point lower than the melting point of the base polyethylene resin. As used herein, the term "boiling point" means the normal boiling point. Preferably, the liquid has a boiling point of no more than the Vicat softening point of the base polyethylene resin, as determined by ASTM Method D 1525 using a standardised loading of 10 Newtons. Preferably, the liquid has a boiling point of no more than 100° C., preferably no more than 90° C., most preferably no more than 80° C. Liquids with lower boiling points are more readily removed by vaporisation, thereby providing a dispersion of planar carbon nanoparticles in the base polyethylene resin.

In some embodiments, the liquid has a viscosity of no more than 10 cps. Preferably the viscosity is no more than 5 cps, more preferably no more than 2 cps. A low viscosity liquid may be better able to displace gas in the interparticle voids between the planar carbon nanoparticles as supplied, and is easier to mix to create a homogeneous dispersion of the base polyethylene resin and the planar carbon nanoparticles.

The liquid should preferably have a low, preferably negligible, propensity for swelling or penetrating the base polyethylene resin under the conditions of the process. In some embodiments it is preferred that the dispersion of carbon nanoparticles in the base polyethylene resin provided after removal of the sufficient amount of the liquid is a particulate solid. A liquid which swells or softens the polyethylene may cause an undesirable agglomeration of the base polyethylene resin particles, particularly if the dispersion of the base polyethylene resin and planar carbon nanoparticles in the liquid or the removal of the sufficient amount of the liquid is conducted at elevated temperatures, such as temperatures above 50° C., or above 60° C. or above 70° C.

The liquid should preferably not be, or comprise, a compound which acts as a polyethylene stress cracking agent. The residual presence of such compounds, for example compounds which swell or penetrate the base polyethylene resin, may lead to accelerated crack formation in a pressure pipe fabricated from the composition.

The liquid should preferably support a stable dispersion of planar carbon nanoparticles. Preferably, a homogeneous dispersion of planar carbon nanoparticles in the liquid, in the proportions preferred for the process of the invention, should not show visible flocculation or sedimentation within a period of 10 minutes, preferably 1 hour, more preferably within a period of 1 day or 1 week, after mixing has been terminated.

The liquid may be selected from the group consisting of water, alcohols, ethers, ketones, esters, nitriles, alkanes, fluorinated hydrocarbons, chlorinated hydrocarbons, chlorinated fluorocarbons, fluorocarbons and hydrochlorofluorocarbons (HCFCs), or mixtures thereof. Preferably, the liquid is not aromatic. Preferably the liquid is not a cyclic hydrocarbon. Preferably, the liquid is not a hydrocarbon. In some embodiments, the liquid may be, or consist predominantly of, an oxygen-containing compound. In some embodiments, the liquid may be selected from the group consisting of water, alcohols, ethers, ketones, and esters, or mixtures thereof. In some embodiments, the liquid is selected from the group consisting of water, ethanol, acetone, diethylether, ethylacetate, acetonitrile, isopropanol, methylacetate, isopropyl acetate and methanol. In some embodiments, the liquid is selected from the group consisting of ethanol, acetone, diethylether, ethylacetate, acetonitrile, isopropanol, methylacetate, isopropyl acetate and methanol. In some embodiments, the liquid is selected from the group consisting of ethanol, acetone, diethylether and mixtures thereof. In one embodiment, the liquid is ethanol.

Dispersing the Base Polyethylene Resin and the Planar Carbon Nanoparticles in the Inert Liquid Conventional processes for production of polyethylene composites, such as melt compounding of dry-blended mixtures of the resin and the filler in a compounder or an extruder, typically produce composites with a poor dispersion. Furthermore, the addition of fillers into existing processes may present an operational challenge, potentially resulting in reduced throughput or requiring the provision of new process equipment, particularly where such fillers are characterised by a low bulk density.

Previously disclosed solution processes for preparing composite materials involve dispersing a filler in a solution of a polymer resin in a liquid at conditions under which the polymer is solubilised, followed by removal of the liquid by vaporisation or precipitation of the composite. Although adequately dispersed composites may be prepared in such a process, solution processing is not well suited for the production of polyethylene composites owing to the challenges of scaling such a process for commercial implementation, and the low solubility of polyethylene (particularly medium or high density polyethylene) in most liquids.

The process of the invention comprises dispersing the base polyethylene resin and the planar carbon nanoparticles in an inert liquid at conditions under which the base polyethylene resin is not solubilised in the inert liquid.

In some embodiments, the total volume of the inert liquid in which the base polyethylene resin and the planar carbon nanoparticles are dispersed is at least half, preferably at least equal to, more preferably at least twice, the total dry volume of the planar carbon nanoparticles. As used herein, the term "total dry volume" in relation to a particulate solid material refers to the sum of the particle volume (including any internal pore volume) and the interparticle void volume. Planar carbon nanoparticles as supplied or manufactured may have a very low bulk density, with a large ratio of interparticle void volume relative to particle volume. A sufficient total amount of liquid may thus be required to displace the air, or other gas, filling the interparticle voids between the planar carbon nanoparticles. However, it is preferred that no more inert liquid is used than is required to provide a satisfactory dispersion. In some embodiments, therefore, the total volume of the inert liquid is less than five times, or less than three times the total dry volume of the planar carbon nanoparticles.

The planar carbon nanoparticles may be in an amount of from 0.1% to 20% by weight of the polyethylene nanocomposite. In some embodiments, the planar carbon nanoparticles may be in an amount of from 1% to 15% by weight, or from about 3 to 10% by weight. Such embodiments are typically selected when the composition prepared by the process of the invention is intended for use in an ultimate application without substantial dilution by a further polyethylene resin in a subsequent melt processing step. The present inventors have advantageously found that significant improvement in properties can be achieved through the use of only a relatively small quantity of planar carbon nanoparticles in the nanocomposite produced by the process of the invention.

Alternatively, the planar carbon nanoparticles may be in an amount of from 5% to 70% by weight of the polyethylene nanocomposite. In some embodiments, the planar carbon nanoparticles may be in an amount of from 20% to 50% by weight. In one embodiment, the planar carbon nanoparticles may be in an amount of from 30% to 40% by weight of the polyethylene nanocomposite. Such embodiments may be selected when the composition prepared by the process of the invention is a masterbatch composition. As used herein, a "masterbatch composition" means a composition comprising a base polyethylene resin and a filler, which is used for compounding together with a further polyethylene resin, typically being the same as or similar to the base polyethylene resin, to produce a final composition wherein the weight % of filler is substantially lower than in the masterbatch composition. Masterbatch compositions are used as a convenient means to introduce fillers into industrial processes for the production of polyethylene composites.

The base polyethylene resin and the planar carbon nanoparticles may be dispersed in the inert liquid by any suitable technique. In some embodiments, the base polyethylene resin and the planar carbon nanoparticles are dispersed in the liquid by mixing. In some embodiments, the base polyethylene resin and the planar carbon nanoparticles are dispersed in the liquid by mechanical mixing, for example with an agitator such as an overhead stirrer. In other embodiments, the base polyethylene resin and the planar carbon nanoparticles are dispersed in the liquid by sonication, for example with a probe sonicator. In other embodiments, the base polyethylene resin and the planar carbon nanoparticles are dispersed in the liquid by bubble-induced turbulence caused by an introduced gas or by vaporisation of the liquid.

In one embodiment vaporisation of the liquid is employed to simultaneously disperse the base polyethylene resin and the planar carbon nanoparticles by bubble-induced turbulence and to remove the sufficient amount of the liquid.

The base polyethylene resin and the planar carbon nanoparticles may be dispersed in the liquid at a temperature below the melting point of the base polymer resin. Preferably the dispersion is performed at a temperature below the Vicat softening point of the base polyethylene resin, as determined by ASTM Method D 1525 using a standardised loading of 10 Newtons. Preferably the dispersion is performed at a temperature below 110° C., or below 100° C., or below 90° C. The temperature should preferably be selected to avoid substantial swelling or penetration of the base polyethylene resin by the liquid, and to avoid agglomeration or coalescence of the particles of the base polyethylene resin.

In some embodiments, the planar carbon nanoparticles are dispersed in the liquid and the base polyethylene resin is added to the dispersion of the planar carbon nanoparticles in the liquid. Initial dispersion of the planar carbon nanoparticles in the liquid, in the absence of the polyethylene resin, may improve the dispersion of the planar carbon nanoparticles in the liquid, and ultimately of the planar carbon nanoparticles in the base polyethylene resin.

Removing the Liquid

The sufficient amount of inert liquid is preferably removed while maintaining a dispersion of the base polyethylene resin and planar carbon nanoparticles in the inert liquid. This assists in ensuring that the dispersion of the planar carbon nanoparticles in the base polyethylene resin provided by removing the sufficient amount of liquid has a substantially homogeneous distribution of planar carbon nanoparticles throughout the base polyethylene resin. If the sufficient amount of liquid is removed without maintaining a dispersion of the base polyethylene resin and planar carbon nanoparticles in the liquid, for example by allowing the particulate material to settle gravimetrically, the base polyethylene resin particles and the planar carbon nanoparticles may segregate, for example by settling at different rates, thereby resulting in an inhomogeneous distribution of planar carbon nanoparticles throughout the base polyethylene resin once the sufficient amount of liquid has been removed.

In some embodiments, the sufficient amount of liquid is removed at conditions under which the base polyethylene resin is not solubilised in the inert liquid. By this it is meant that the conditions, including the temperature, are selected such that the base polyethylene resin does not become dissolved in the liquid when removing the sufficient amount of liquid.

The amount of the liquid removed may be sufficient such that the dispersion of planar carbon nanoparticles in the base polyethylene resin contains no more than 10% by weight of the liquid. Preferably the dispersion contains no more than 5%, preferably no more than 2% by weight of the liquid. Residual liquid may adversely affect the properties of the polyethylene nanocomposite. The extent of removal of the liquid may be chosen having regard to the equipment to be used in subsequent melt compounding of the composition. In some embodiments compounding equipment may be used which allows venting of volatile materials and in such cases a relatively high amount, such as from 5% to 10% or even more, of the liquid may remain. In other embodiments, such as where compounding equipment without the capacity for processing substantial quantities of volatiles is to be used for melt compounding of the nanocomposite, it may be preferred to remove a higher proportion of the liquid so that no more than 5%, preferably no more than 2%, remains prior to melt compounding.

The sufficient amount of inert liquid may be removed by vaporising the liquid. In some embodiments, the liquid may be removed by heating the dispersion of the base polyethylene resin and the planar carbon nanoparticles in the inert liquid so as to vaporise the liquid. Preferably, the sufficient amount of the liquid is removed by vaporising the liquid while maintaining the temperature of the liquid below the melting point of the base polyethylene resin. Preferably the sufficient amount of the liquid is removed by vaporising the liquid while maintaining the temperature of the liquid below the Vicat softening point of the base polyethylene resin, as determined by ASTM Method D 1525 using a standardised loading of 10 Newtons, or below 110° C., or below 100° C., or below 90° C. In some embodiments, the liquid may be removed by vaporising the liquid under reduced pressure. In some embodiments, the liquid may be removed by heating the dispersion of the base polyethylene resin and the planar carbon nanoparticles in the inert liquid under reduced pressure.

In some embodiments, the sufficient amount of the liquid is removed by vaporising the liquid below the melting point of the base polyethylene resin, preferably below 100° C., such that the dispersion of planar carbon nanoparticles in the base polyethylene resin contains no more than 10% by weight of the liquid, preferably no more than 5%, more preferably no more than 2%.

The dispersion of planar carbon nanoparticles in the base polyethylene resin provided by removal of the sufficient amount of the liquid may have a similar, or not unacceptably reduced, bulk density compared to that of the base polyethylene resin in particulate form. This may be so even when the planar carbon nanoparticles provided have a very low bulk density. It is preferred that the bulk density of the dispersion of planar carbon nanoparticles in the base polyethylene resin is at least 60%, more preferably at least 70%, still more preferably at least 80% of the bulk density of the base polyethylene resin in particulate form as provided.

Furthermore, the dispersion of planar carbon nanoparticles in the base polyethylene resin prepared by the process of the invention may have a similar, or not unacceptably reduced, bulk density compared to that of the base polyethylene resin, when a dry-blended composition comprising the same relative quantities of the planar carbon nanoparticles and the base polyethylene resin has a bulk density that is substantially lower, or unacceptably lower, than that of the base polyethylene resin in particulate form.

Compositions with a bulk density similar to, or not unacceptably reduced from, that of the base polyethylene resin may be advantageous, as they may be subsequently processed on similar or identical equipment as used for processing polyethylene resins such as the base polyethylene resin, without substantial or unacceptable loss of throughput.

In some embodiments, the sufficient amount of liquid is removed under conditions for melt compounding of the dispersion of planar carbon nanoparticles in the base polyethylene resin. In such embodiments, a dispersion of the planar carbon nanoparticles in the base polyethylene resin is obtained by vaporising the liquid at temperatures above the melting point of the base polyethylene resin, and the dispersion is simultaneously or sequentially melt compounded to prepare a melt-compounded polyethylene nanocomposite.

In some embodiments, the sufficient amount of the liquid is removed by vaporising the inert liquid under conditions for melt compounding of the dispersion of the planar carbon nanoparticles in the base polyethylene resin, such that the dispersion of planar carbon nanoparticles in the base polyethylene resin contains no more than 10% by weight of the liquid, preferably no more than 5%, more preferably no more than 2%.

In embodiments wherein the sufficient amount of the liquid is removed under conditions for melt compounding, the dispersion of resin and nanoparticles in the inert liquid may be fed directly to a melt compounder. Such an embodiment advantageously avoids the necessity of performing a separate liquid removal step prior to melt compounding, although it is necessary in such embodiments to use melt compounding equipment that is adapted to process a large quantity of the vapourised inert liquid.

Melt compounding processes wherein substantial quantities of volatile liquids are processed together with polyethylene compositions, and suitable process equipment for such processes, have been described in the art. In such processes, the volatile liquids are separated from the polyethylene compositions by flash-vaporisation and recovered in an overheads condensation section. A person skilled in the art will appreciate that in such processes, flashing of the volatile liquids and melting of the polyethylene occur simultaneously or immediately sequentially, and that the polyethylene composition is typically not solubilised in the volatile liquids during the melt compounding. Nevertheless, embodiments where the base polyethylene resin is solubilised in the liquid while removing the liquid under conditions for melt compounding the nanocomposite remain within the scope of the invention. The liquid removed under conditions for melt compounding may optionally be recovered and reused in the process.

Overall Process

In some embodiments, each of dispersing the base polyethylene resin and the planar carbon nanoparticles in the inert liquid and removing a sufficient amount of the liquid is performed at a temperature below the melting point of the base polyethylene resin. Preferably, each of dispersing the base polyethylene resin and the planar carbon nanoparticles in the inert liquid and removing a sufficient amount of the liquid is performed at a temperature below the Vicat softening point of the base polyethylene resin, as determined by ASTM Method D 1525 using a standardised loading of 10 Newtons, more preferably below 100° C., or below 90° C., or below 80° C.

In some embodiments, the base polyethylene resin particles do not substantially swell due to penetration by the inert liquid when dispersing the base polyethylene resin and the planar carbon nanoparticles in the inert liquid and removing a sufficient amount of the liquid.

Base Polyethylene Resin in the Form of a Particulate Solid

The process of the present invention comprises providing a base polyethylene resin in the form of a particulate solid. The base polyethylene resin may be medium density polyethylene or high density polyethylene. Preferably it is high density polyethylene.

The base polyethylene is provided in the form of a particulate solid. In some embodiments, the base polyethylene resin is in the form of a powder, preferably a free flowing powder. In some embodiments, the base polyethylene resin is a reactor powder, for example the reaction powder produced in a gas phase polymerisation reactor. In other embodiments, the base polyethylene resin may be supplied as a powder that has been produced by grinding pelletised polyethylene. In some embodiments, the base polyethylene resin may be supplied as micropellets. As used herein, the term "micropellet" refers to a pellet with a diameter of less than 1 mm. In some embodiments, the base polyethylene resin may be supplied as minipellets. As used herein, the term "minipellet" refers to a pellet with a diameter of less than 2 mm. In some embodiments, the base polyethylene resin may be supplied as pellets with a diameter above about 2 mm, provided that the pellets may be dispersed in the liquid.

The base polyethylene resin preferably has an $MPS_{95}$ less than 2000 micrometers. As used herein, the $MPS_{95}$ of a particulate solid is the maximum particle size for those 95.0 volume % of the particles which have the smallest particles sizes, i.e. 95.0 volume % of the material is found in particles with a size equal to or smaller than $MPS_{95}$. Preferably, the base polyethylene resin has an $MPS_{95}$ less than 1500 micrometers, or less than 1000 micrometers.

The base polyethylene resin preferably has a weight-based average particle size of less than 2000 micrometers. Preferably the weight-based average particle size is less than 1500 micrometers, or less than 1000 micrometers.

The base polyethylene resin employed in the process of the invention may belong to a class of polyethylene resin selected from the group consisting of PE80, PE100 and PE112 resins. The terms "PE80" and "PE100" are classifications for polyethylene resin described in ISO 12162. Preferably the base polyethylene resin employed in the process of the invention is a PE100 resin.

Polyethylene resins falling within a particular class of resin may have different compositional characteristics although common to each member of the class is the ability to meet or exceed the MRS rating defined for that class.

Polyethylene resins belonging to the class of PE80, PE100 or PE112 resins may have at least one of the following properties, and may have a combination of two or more of these properties:
 a melt flow index (MFI) in the range of 0.10 to 1.4 g/10 min (preferably 0.1 to 0.90 g/10 min) at 190° C. and 5 kg as measured according to ISO 1133;
 a high load melt flow index ((HLFI) in the range of from 2 to 20 g/10 min at 190° C. and 21.6 kg as measured according to ISO 1133; and
 a density in the range of from about 0.930 to about 0.970 g/cm³ at 23° C. as measured according to ASTM D792.
 resistance to slow crack growth of at least 1000 hours when the time to failure is measured according to ASTM F 1473-97 at 80° C. in air, 2.4 MPa tensile stress, and a standard notch depth of 3.5 mm.

It is preferred the base resin will have all of these properties.

Melt flow index (MFI) and high load melt flow index (HLFI) provide an indication of the flowability and processability of the base polyethylene resin and are related to the viscosity of the base resin in its molten state. MFI and HLFI may also be related to the average molecular weight of the polymer chains in the polyethylene resin. A lower melt index at a defined load and temperature is indicative of higher viscosity and a higher average molecular weight for the base polyethylene resin. The density of the base polyethylene resin can provide an indication of the tensile yield stress and toughness of the base polymer resin.

In general, much of the work done in preparing polyethylene nanocomposites with a range of nanoparticle types has used a base polyethylene resin of high melt flow index. A high melt flow index has been found in many instances to be required to obtain an acceptable dispersion of nanoparticles in polyethylene. However, low melt flow index resins are preferred for applications where high strength is required, such as for pressure pipes. We have found that, by employing the process of the present invention, planar carbon nanoparticles may also be well dispersed in a base polyethylene resin of low melt flow index.

In some embodiments, the base polyethylene resin provided has a melt flow index (MFI) in the range of from 0.10 to 1.4 g/10 min, preferably 0.10 to 0.90 g/10 min, more preferably in the range of 0.10 to 0.40 g/10 min, at 190° C. and 5 kg as measured according to ISO 1133.

In some embodiments of the invention, the base polyethylene resin provided has a high load melt flow index (HLFI) in the range of from 2 to 20 g/10 min, such as 4 to 20 g/10 min at 190° C. and 21.6 kg as measured according to ISO 1133.

In some embodiments of the process of the invention, the base polyethylene resin provided has a density of at least 0.930 g/cm³, preferably a density in the range of from about 0.940 to about 0.970 g/cm³, more preferably a density in the range of from about 0.945 to about 0.96 g/cm³, at 23° C. as measured according to ASTM D792.

In one set of embodiments, it can be desirable for the base polyethylene resin provided to have a high density (greater than about 0.940 at 23° C.) and a low melt flow index (less than about 0.90 g/10 min at 190° C. and 5 kg).

In some embodiments, the base polyethylene resin has a melt flow index in the range of from 0.10 to 0.9 g/10 min at 190° C. and 5 kg as measured according to ISO 1133, high load melt flow index of from 2 to 20 g/10 min at 190° C. and 21.6 kg as measured according to ISO 1133 and a density in the range of from about 0.930 to about 0.970 g/cm³ at 23° C. as measured according to ASTM D792.

The base polyethylene resin provided comprises at least one polyethylene polymer, and may comprise a blend of two or more polyethylene polymers, such as a blend of a polyethylene copolymer and a polyethylene homopolymer or a blend of two or more polyethylene copolymers of different molecular weight and/or composition.

The base polyethylene resin employed in the process of the invention may have a unimodal or multimodal molecular weight distribution. A person skilled in the relevant art would understand that a polyethylene resin having a multimodal molecular weight distribution would contain two or more polymer fractions of different average molecular weight. A multimodal molecular weight distribution may, for example, be a bimodal or trimodal molecular weight distribution. Generally, a multimodal resin is preferred as this allows a higher strength to be obtained, particularly where there is regular incorporation in the higher molecular weight fraction of an alpha olefin.

The modality of a molecular mass distribution can be determined using conventional techniques, such as gel permeation chromatography (GPC). The different average molecular weights of different polymer fractions in a multimodal polyethylene resin may be observed as different distinct maxima in a molecular weight distribution curve for the polymer resin. In some instances, the presence of different polymer fractions may also be observed as a broadening of the molecular weight distribution curve or a deviation in the shape of the distribution curve from a normal Gaussian curve. A bimodal polyethylene would contain two polymer fractions of different average molecular weight, which could be observed as two distinct maxima.

In one set of embodiments, a base polyethylene resin suitable for use in the process of the invention may be a bimodal polyethylene resin. The bimodal polyethylene resin has a bimodal molecular weight distribution comprising a low molecular weight polymer fraction and a high molecular weight polymer fraction. The low molecular weight polymer fraction may constitute from about 10 to 90% by weight of the polyethylene resin. The high molecular weight polymer fraction in the polyethylene resin may constitute a weight fraction (% weight) such that the sum of the low molecular weight polymer fraction and the high molecular weight polymer fraction is 100% by weight, with % by weight being relative to the total weight of the polyethylene resin.

In some embodiments, the base polyethylene resin is a bimodal polyethylene resin comprising a low molecular weight polymer fraction which is from 20 to 80% by weight, preferably from 25 to 70% by weight, more preferably from 30 to 60% by weight of the polyethylene resin, and a high molecular polymer fraction which is from 80 to 20%, preferably from 75 to 30%, more preferably from 70 to 40% by weight, of the polyethylene resin.

In one set of embodiments, the high molecular weight polymer fraction comprises a polyethylene copolymer. In some embodiments, the high molecular weight polymer fraction comprises polymer chains having a weight average molecular weight of more than 50,000. In some embodiments, the polymer chains of the high molecular weight fraction have a lower molecular weight limit of 3500.

The low molecular weight polymer fraction may comprise a polyethylene homopolymer or a polyethylene copolymer. In one set of embodiments, the low molecular weight polymer fraction comprises polymer chains having a weight average molecular weight of 50,000 or less. In one preference, the low molecular weight polymer fraction comprises chains of polyethylene homopolymer or copolymer.

As used herein, the term "polyethylene homopolymer" refers to an ethylene polymer that consists substantially (i.e. at least 90% by weight, preferably at least 95% by weight, more preferably at least 97% by weight) of ethylene and thus a polyethylene homopolymer preferably predominately comprises ethylene monomer.

As used herein, the term "polyethylene copolymer" refers to a polymer that is formed from the copolymerisation of ethylene and at least one co-monomer. Preferably, the co-monomer is at least one alpha-olefin. The alpha-olefin co-monomer may comprise from 3 to 12 carbon atoms, preferably from 4 to 8 carbon atoms. In some embodiments, the alpha-olefin co-monomer is selected from the group consisting of 1-butene, 1-pentene, 1-hexene, 1-heptene, 1-octene and mixtures thereof. In one preference, the alpha-olefin co-monomer is selected from the group consisting of C4, C5 and C6 alkenes, and mixtures thereof, and preferably, may be selected from the group consisting of 1-butene, 1-pentene, 1-hexene and mixtures thereof.

Polyethylene copolymer present in the high molecular weight polymer fraction of a bimodal polyethylene resin may comprise alpha-olefin in an amount from about 0.5% to 8% by weight, preferably from about 2% to 6% by weight (or from 2% to 4% by weight). It is preferred that the alpha olefin is regularly distributed along the polymer backbone of the high molecular weight fraction.

In some embodiments, the base polyethylene resin has a multimodal molecular weight distribution and comprises at least one alpha-olefinic co-monomer regularly incorporated into a high molecular weight fraction of the polyethylene resin to achieve from 0.5% to 8% by weight of the high molecular weight fraction.

In some embodiments, the base polyethylene resin has a bimodal molecular weight distribution with a low molecular weight fraction of from 30% to 60% by weight and a high molecular weight fraction in an amount of from 70% to 40% by weight of the base polyethylene resin and the high molecular weight fraction incorporates from 0.5% to 8% by weight of alpha-olefin which is regularly distributed in the high molecular weight fraction.

The base polyethylene resin may comprise polyethylene copolymer having an amount of alpha-olefin monomer sufficient to achieve an extent of short chain branching in the polyethylene resin of between 5 to 25 per 1000 carbon atoms in the high molecular weight polymer fraction, and an extent of short chain branching of between 2 to 15 per 1000 carbon atoms in the combined high and low molecular weight polymer fractions.

In one set of embodiments, the base polyethylene resin is a multimodal PE100 resin, preferably a bimodal PE100 resin. A bimodal PE100 resin employed as a base polyethylene resin may comprise polyethylene copolymer having an amount of alpha-olefin monomer sufficient to achieve an extent of short chain branching in the polyethylene resin of between 5 to 25 per 1000 carbon atoms in the high molecular weight polymer fraction, and an extent of short chain branching of between 2 to 15 per 1000 carbon atoms in the combined high and low molecular weight polymer fractions.

The base polyethylene resin may be selected from any one of the polyethylene resins have a Minimum Required Strength (MRS) of at least 8.0 MPa, preferably at least 10.0 MPa, as determined according to ISO 9080. Polyethylene resins with a MRS of 8.0 MPa are generally less preferred, as resins with an MRS of 10.0 MPa can be readily prepared using process technology which provides regular incorporation of alpha-olefinic co-monomer into the high molecular weight fraction of a multimodal polyethylene. However the incorporation of planar nanoparticles by the process of the invention also allows compositions with MRS of 10.0 MPa or higher to be prepared from resin for which such high MRS has not previously been accessible.

The MRS is a standard industry benchmark which represents a design stress rating for a polyethylene composition and relates to the circumferential or hoop stress that a standard pipe formed from the composition can withstand at a temperature of 20° C. for 50 years without failure. The MRS rating, as described in ISO9080, takes into account both tensile strength and resistance to brittle failure properties of compositions for pipe service, since pipe failures can occur via different mechanisms if the composition is deficient in either strength (potentially resulting in ductile failures) or slow crack growth properties (potentially resulting in brittle failures).

In order to determine the MRS rating for a composition, the time to failure of a standard pipe prepared with the composition is typically measured at a range of temperatures (20° C., 60° C. and 80° C.) and hoop stresses, in accordance with ISO 1167. The data is then extrapolated, according to the statistical methodology of ISO 9080, to estimate the hoop stress that would cause the pipe to fail at 50 years at 20° C. The material's intrinsic properties in terms of tensile yield stress and resistance to slow crack growth are critical in the actualization of an MRS value for a polymer pipe material. If the tensile yield stress is too low, the material cannot bear the stresses required at the different test temperatures to achieve a certain minimum required strength value. Furthermore, if the tensile yield stress is sufficient but the resistance to slow crack growth is too low, the material becomes susceptible to brittle failures at higher test temperatures, which provide an accelerated simulation of long-term brittle failure modes. This results in a distinct steepening of the slope of the stress-time data that culminates in considerable degradation of the calculated MRS value and ultimately could render the material being classified as unfit for pressure pipe applications. Pipes fabricated from a composition with an MRS of 8.0 MPa, 10.0 MPa or 11.2 MPa are capable of withstanding internal pressures of at least 8.0 MPa, 10.0 MPa and 11.2 MPa, respectively, for 50 years at 20° C.

Previous uses of fillers and particulates to improve rigidity and tensile yield stress (i.e. strength) in polyolefin composites have generally been associated with embrittlement/decreased resistance to brittle failure, to the extent that the use of strength-enhancing fillers has been avoided when preparing polyethylene compositions with the necessary MRS rating for pressure pipe applications. Surprisingly, the inventors have found that high MRS polyethylene compositions combining increased tensile strength while retaining acceptable brittle failure properties can be produced using the method of the invention. The loss of slow crack resistance is sufficiently low when the process of the invention is followed to allow a high MRS composition to be produced. Nevertheless, it will be appreciated by the skilled person that the slow crack resistance of a base polyethylene resin cannot be improved by incorporating a filler. Therefore, the base polyethylene resin should have slow crack growth resistance properties that at least meet, and preferably exceed, the usage requirements for any filled composite produced therefrom.

Accordingly, in some embodiments, the base polyethylene resin has a slow crack growth resistance of at least 1000 hours, preferably at least 2000 hours when measured according to ASTM F1473-97 at 80° C. in air, 2.4 MPa tensile stress with a 10 mm thickness specimen and a standard notch depth of 3.5 mm.

In some embodiments, the base polyethylene resin has a slow crack growth resistance of at least 200 hours, preferably at least 400 hours, most preferably at least 800 hours when measured according to ASTM F1473-97 at 80° C. in air, 2.4 MPa tensile stress with a 10 mm thickness specimen, but with a non-standard notch depth of 5 mm and with the specimen continuously exposed to a surfactant mixture composed of 10 wt % polyoxyethylene nonylphenylether, 1 wt % sodium laureth sulphate and 1 wt % sodium xylene-sulfonate mixed in water. It has been found that using a non-standard notch depth of 5 mm (rather than the standard depth of 3.5 mm) and a surfactant accelerant when testing a specimen employing an otherwise standard ASTM F1473-97 test may be useful for quantifying the slow crack resistance of polyethylene compositions for high pressure pipe applications. For high performance compositions with a very high resistance to slow crack growth, the time to failure in a standard ASTM F1473-97 test may be too great for convenient measurement in laboratory tests.

The base polyethylene resin employed in the process of the invention may be prepared using conventional processes known in the art, including continuous and batch-wise processes, employing monomers known in the art. Conventional processes for preparing suitable base polyethylene resins may involve the polymerisation of appropriate monomers in the presence of catalysts, such as Ziegler-Natta, transition metal or metallocene catalysts.

Some examples of base polyethylene resins that may be used in the process of the invention are described in U.S. Pat. No. 6,441,096, WO 01/79345, EP 1460105, U.S. Pat. Nos. 6,878,784, 6,787,608 and WO 2013/110452, incorporated herein by reference.

Planar Carbon Nanoparticles

The process of the present invention also comprises providing planar carbon nanoparticles. In some embodiments, the planar carbon nanoparticles are selected from the group consisting of graphene, graphite, exfoliated graphite nanoparticles, and mixtures thereof.

Graphite consists of a plurality of layered planes of hexagonal arrays or networks of carbon atoms. The layered planes of hexagonally arranged carbon atoms are substantially flat and are oriented substantially parallel to one another. The carbon atoms on a single layered plane are covalently bonded together, and the layered planes are bonded by substantially weaker van der Waals forces. Graphite is also an anisotropic structure and exhibits many properties that are highly directional. Graphite also possesses a high degree of orientation. Graphite includes natural graphite, Kish graphite and synthetic graphite. Natural graphite is found in nature. Kish graphite is the excess carbon, which crystallizes in the course of smelting iron. Synthetic graphite is typically produced by pyrolysis or thermal decomposition of a carbonaceous gas at elevated temperatures above 2500° C.

Planar carbon nanoparticles employed in the nanocomposite prepared by the process of the invention are generally in particle form with at least one dimension in the nanometre range, i.e. less than 100 nm. In some embodiments, the planar carbon nanoparticles may be in the form of nanosheets, nanoplatelets, nanoflakes, and the like. It is preferred that the carbon nanoparticles provided to the process have a planar structure as it has been found that non-planar particles (e.g. carbon nanotubes and nano-sized carbon black particles or powder) do not provide the desired improvement in mechanical properties.

The planar carbon nanoparticles consist predominantly of elemental carbon, and are thus used in a reduced form. The skilled person will appreciate that planar carbon nanoparticles may in practice include oxidic functionalities as a minor component, for example as remnants of the preparation methodology. Nevertheless, the planar carbon nanoparticles are to be distinguished from oxidised nanoparticles such as graphite oxide and graphene oxide. In such nanoparticles, the hexagonal network of carbon atoms in the layers is substantially disrupted by the presence of carbon-oxygen bonds, which significantly affects properties of the nanoparticles such as polarity, dispersibility and conductivity, among others. It has been found that planar carbon nanoparticles impart superior mechanical properties when used in the process of the invention, compared with planar carbon oxide particles. Without wishing to be bound by theory, it is believed that the substantially reduced, non-polar carbon surfaces of planar carbon nanoparticles are more compatible with polyethylene than the substantially oxidised surfaces of nanoparticles such as graphene oxide. Thus, in some embodiments, the planar carbon nanoparticles comprise at least 70% by mass of carbon, preferably at least 80% by mass of carbon, more preferably at least 90% by mass of carbon, and most preferably at least 95% by mass of carbon.

Furthermore, it has been surprisingly found that planar carbon nanoparticles, including those with high surface areas, may be well dispersed in an inert liquid together with a base polyethylene resin, such that a nanocomposite with superior mechanical properties may thereby be prepared. Oxidised nanoparticles (such as graphene oxide) are known to be highly dispersible in inert liquids (for example, water) as a result of the surface oxygen groups. However, it has previously been considered challenging to produce satisfactory dispersions of planar carbon nanoparticles, and in particular high surface area planar carbon nanoparticles, due to the tendency of such nanoparticles to aggregate. The favourable nanocomposite properties obtained by the process of the invention, which includes the step of dispersing the hydrophobic planar carbon nanoparticles together with hydrophobic polyethylene particles in an inert liquid, is thus unexpected, particularly considering that polar inert liquids with low boiling points may be successfully used.

In some embodiments, the nanocomposite produced by the process of the invention comprises graphene. Graphene is a monolayer carbon material consisting of a one-atom thick planar array of carbon atoms arranged in a two-dimensional hexagonal lattice pattern. Graphene is a component of graphite, which is a layered planar structure composed of stacks of graphene. Graphene may be obtained from chemical vapour deposition processes or from graphite that has undergone an expansion and/or exfoliation procedure that allows individual sheets of graphene to be separated from one another.

In some embodiments, the nanocomposite prepared by the process of the invention comprises exfoliated graphite nanoparticles (xGnP). Exfoliated graphite is generally effective and is commercially available at economical cost. Exfoliated graphite nanoparticles are also obtained from graphite and consist of small stacks of graphene sheets. Generally, in exfoliated graphite nanoparticles, the sheets of graphene are not completely separated from one another. In some embodiments the exfoliated graphite nanoparticles have fewer than 50 single sheet layers, preferably fewer than 20 single sheet layers of graphene. Exfoliated graphite nanoparticles may also be known in the art as expanded graphite.

Graphene and exfoliated graphite nanoparticles may be obtained by treating graphite using methods known in the art, such as fluorination, acid treatment, high temperature thermal treatment, mechanical pulverisation, milling and the like. Such treatment may result in expansion and/or exfoliation of the graphite to produce graphene, reduced graphene oxide or exfoliated graphite nanoparticles, or a combination of these types of nanoparticles.

To expand or exfoliate the inter-planar spacing between the layered planes, the intercalated graphite is exposed to very high heat in a relatively short amount of time. Without being bound by any particular theory, the exfoliated mechanism is the decomposition of the trapped intercalating agent, such as sulfuric and nitric acids ($H_2SO_4+HNO_3$), between the highly oriented layered planes when exposed to heat.

Suitable exfoliated processes include heating the intercalated graphite for a few seconds at temperatures of at least greater than 500° C., more preferably greater than 700° C., and more typically 1000° C. or more. The high temperature causes thermal reduction of the intercalated carbon, with the resulting release of gases driving the expansion of the carbon layers. The treated graphite typically expands in the "c" direction 100 to more than 300 times the pre-treatment thickness. In one preferred exfoliating process, the intercalated graphite is exposed to temperature of 1050° C. for 15 seconds to achieve an expansion in the "c" direction of 300 times of that in the pre-exfoliated graphite. Exfoliated graphite nanoparticles prepared in this manner are also known as thermally reduced exfoliated graphene oxide nanoparticles.

The planar carbon nanoparticles may be provided by exfoliation of graphite, or expanded graphite, in a suitable liquid. Exfoliation may be performed by sonicating a mixture of the graphite or expanded graphite and the suitable liquid. Sonication, also known as ultrasonication, is a process where sound waves are used to agitate or disperse particles in a sample. In some embodiments, the suitable liquid is the same as the inert liquid of the process of the invention. In some embodiments, the planar carbon nanoparticles are provided by in situ formation in the inert liquid. By this it is meant that the planar carbon nanoparticles are formed, for example by exfoliation of graphite, in the inert liquid in which the base polyethylene resin and the planar carbon nanoparticles are dispersed. Optionally, the planar carbon nanoparticles are formed in situ in the inert liquid prior to the addition of the base polyethylene resin. Alternatively, the planar carbon nanoparticles are formed in situ in the inert liquid in the presence of the base polyethylene resin.

In some embodiments, the nanocomposite produced by the process of the invention comprises reduced graphene oxide. Graphene oxide nanoparticles may be produced by sonication (or other mechanical agitation methods) of graphite oxide, for example in water, or by oxidation of thermally exfoliated graphite nanoparticles. However, it is understood in the art that graphene oxide nanoparticles comprise less than about 63% carbon content, and graphene oxide nanoparticles must therefore be reduced to produce planar carbon nanoparticles suitable for the process. Suitable reduction methodologies may include both chemical and thermal reductions.

In one set of embodiments, the planar carbon nanoparticles may have a mean particle size in the range of from about 1 nm to 50 μm, preferably in the range of from about 10 nm to 10 μm, more preferably in the range of from about 50 nm to 5 μm. The average thickness (smallest) dimension may be less than or equal to 5.0 nm.

In one set of embodiments, the planar carbon nanoparticles may have an aspect ratio of greater than or equal to about 50:1, preferably greater than 100:1, more preferably greater than 200:1, still more preferably greater than 500:1, most preferably greater than 800:1.

In general we have found that the most suitable nanoparticles for use in the invention have a relatively high surface area compared with graphite particles lacking at least one dimension in the nanometre range. In one set of embodiments the planar carbon nanoparticles have a BET (from Brunauer-Emmett-Teller theory) surface area at least 50 $m^2/g$, or at least 100 $m^2/g$, preferably at least 200 $m^2/g$, more preferably at least 400 $m^2/g$. In some embodiments the planar carbon nanoparticles have a BET surface area in the range from 200 to 1000 $m^2/g$, preferably from 400 to 1000 $m^2/g$ and most preferably from 400 to 800 $m^2/g$.

We have found that planar carbon nanoparticles with BET surface areas in the range of from 200 $m^2/g$ to 1000 $m^2/g$, more preferably 400 $m^2/g$ to 800 $m^2/g$, are particularly useful in improving resistance to internal pressure of a pipe fabricated from polyethylene nanocomposite comprising the nanoparticles, without unduly compromising other properties such as toughness and resistance to slow crack growth. Generally below this range the improvement in resistance to internal pressure at a given concentration is reduced. Furthermore, above the range the process of melt blending generally results in clusters or agglomerates of the planar composite nanoparticles which can significantly compromise the desired strength, toughness and processing of the nanocomposite. Planar carbon nanoparticles with BET surface areas within the preferred ranges can be well dispersed in the required base polyethylene resin, including resins having a low melt flow index, using the process of the present invention.

Planar carbon nanoparticles, and particularly planar carbon nanoparticles with high surface areas, are generally materials with very low bulk density. In some embodiments, the planar carbon nanoparticles have a bulk density of below 0.2 g/cm$^3$, or below 0.1 g/cm$^3$, or below 0.05 g/cm$^3$, or below 0.01 g/cm$^3$, or even below 0.005 g/cm$^3$. As discussed herein, the preparation of nanocomposites with very low bulk density fillers presents a particular challenge, as conventional processing equipment such as melt compounders are not well suited to handle such materials. The process of the invention thus provides a convenient means of processing even extremely low bulk density planar carbon nanoparticles, as well as providing a favourable dispersion of the nanoparticles through the polyethylene matrix.

As discussed herein, nanocomposites produced by the process of the invention are thought to possess superior mechanical properties due at least in part to the nature of the planar carbon nanoparticles; in particular their planar shape, their reduced state and their nano-scale dimension(s). Accordingly, an advantage of the planar carbon nanoparticles is that they do not require post-synthesis chemical modification to render them compatible with the base polyethylene resin. In some embodiments, therefore, the planar carbon nanoparticles are not intentionally chemically modified. For example, the surfaces of the planar carbon nanoparticles are preferably not modified with compatibilising functionalities that modulate the polarity of the nanoparticle or improve the adhesion at the nanoparticle-polyethylene interface relative to the unmodified surface.

Other Components of the Polyethylene Nanocomposite

The process of the invention may optionally comprise providing other compounds or components that are conventionally used in the manufacture of compositions used to fabricate articles such as pipes, more particularly, pressure pipes. In one set of embodiments, the nanocomposite produced by the process of the invention may optionally comprise one or more additives. The optional additives may be selected from the group consisting of stabilisers (e.g. heat stabilisers), antioxidants, lubricants, pigments (e.g. carbon black), fillers, UV additives, neutralising additives (e.g. calcium stearate and zinc stearate) and combinations thereof. The additives may constitute from about 0% to about 10%, preferably about 0% to about 5%, by weight of a pipe-forming composition comprising the nanocomposite and the additives.

Subsequent Processing

The process may further comprise melt compounding, also known as melt mixing, the dispersion of the planar carbon nanoparticles in the base polyethylene resin to produce a melt compounded nanocomposite. Melt blending of the components may be conducted so as to further enhance the effective dispersion and distribution of the planar carbon nanoparticles in the base resin. In one set of embodiments, the melt compounding comprises extruding the dispersion of the planar carbon nanoparticles in the base polyethylene resin.

In one set of embodiments, the dispersion of planar carbon nanoparticles in the base polyethylene resin is obtained by removing the sufficient amount of the liquid at temperatures below the melting point of the base polyethylene resin, and the dispersion thus provided is fed to a polymer melt extruder, melt mixer or preferably a twin-screw compounder and melt blended. The polymer melt extruder or mixer should be operated under conditions suitable for forming a homogenous nanocomposite. In an exemplary embodiment, the twin screw compounder is operated at a temperature of at least 180° C. with a specific energy input greater than 0.10 kWhr/kg. In one preferred set of embodiments the twin screw compounder used in the process comprises a screw configuration consisting of forward conveying and left handed screw elements in addition to kneading block elements. Similar results may be achieved on a Brabender rheomixer.

In some embodiments, any remaining inert liquid in the dispersion is substantially removed during the melt compounding or extrusion. Preferably, the amount of the liquid constitutes less than 2% by weight of the melt compounded or extruded polyethylene nanocomposite. More preferably, the amount of the liquid constitutes less than 1%, or less than 0.5%, by weight of the melt compounded or extruded polyethylene nanocomposite produced by the process of the invention.

In some embodiments, a further polyethylene resin is co-compounded in the melt compounding. The further polyethylene resin is optionally the same as or different from the base polyethylene resin. It is preferred that the further polyethylene resin and the base polyethylene resin are similar, preferably the same, as this will avoid any incompatibility issues or the risk of dilution or deterioration of the properties of the base polyethylene arising from the use of different types or grades of polyethylene resin.

In one set of embodiments, the dispersion of planar carbon nanoparticles in the base polyethylene and the further polyethylene resin are blended, for example by tumble blending, before melt compounding.

The co-compounding of the dispersion of planar carbon nanoparticles in the base polyethylene together with the further polyethylene resin may be performed by feeding the optionally pre-blended mixture to a polymer melt extruder or preferably a twin screw compounder and melt blending the mixture. The extruder may be operated at a temperature of at least 180° C. with specific energy input greater than 0.10 kWhr/kg.

A suitable amount of the dispersion of planar carbon nanoparticles in the base polyethylene resin, used in this embodiment as a masterbatch composition, may be combined with an amount of the further polyethylene resin, to provide a nanocomposite with the desired composition. In one set of embodiments an amount of the masterbatch composition in the range of from about 5 to 50% (w/w) is combined with a desired quantity of the further polyethylene resin. The resulting nanocomposite will then contain a desired quantity of planar carbon nanoparticles. A skilled person would be able to determine the quantities of the masterbatch composition and the further polyethylene resin that are to be blended together to form the nanocomposite, having regard to the concentration of nanoparticles in the masterbatch composition.

The melt-compounded nanocomposite may be pelletised. Alternatively, the melt-compounded nanocomposite may be extruded or moulded to form an article, for example a pipe. In one embodiment, the process comprises extruding the nanocomposite to form a pipe.

As discussed herein, nanocomposites produced by the process of the invention are thought to possess favourable mechanical properties due at least in part to the process of dispersing the base polyethylene resin and the planar carbon nanoparticles in an inert liquid, and at least in part to the nature of the planar carbon nanoparticles; in particular their planar shape, their reduced state and their nano-scale dimension(s). Accordingly, an advantage of the process of the invention is that one or more additional processing steps for enhancing dispersion or improving the polymer-nanoparticle interface adhesion may be unnecessary. In some embodiments, therefore, the process of the invention excludes a step of chemically modifying the dispersion of planar carbon nanoparticles in the base polyethylene resin. For example, the process preferably excludes a cross-linking step to induce covalent bond formation between the polyethylene chains, or between the polyethylene chains and the planar carbon nanoparticles, such as by irradiation of the nanocomposite.

In some embodiments, the nanocomposite prepared by the process of the invention may be a masterbatch composition. The use of the nanocomposite prepared by the process of the invention as a masterbatch composition may advantageously aid a more uniform dispersion of the planar carbon nanoparticles within the base polyethylene resin on melt mixers or extruders with less intensive kneading and dispersive capability. Furthermore, such a use may allow existing process equipment for the compounding or extrusion of polyethylene compositions to be used for the production of polyethylene nanocomposites, as only relatively small quantities of a masterbatch composition need to be added.

The masterbatch composition may optionally be melt compounded. However, melt compounding of a masterbatch composition may not be required, considering that masterbatch compositions are generally destined for melt compounded together with a further polyethylene. The masterbatch composition may be in the form of a powder or pellets, preferably pellets.

The nanocomposite prepared by the process of the invention may be in the form of powder or pellets.

The Nanocomposite Prepared by the Process of the Invention

In accordance with another aspect of the invention, there is provided a polyethylene nanocomposite prepared by the process of the invention as described herein. The nanocomposite prepared by the process of the invention desirably exhibits an improvement in one or more mechanical properties over the base polyethylene resin alone which does not contain the planar carbon nanoparticles. Furthermore, the nanocomposite prepared by the process of the invention may exhibit an improvement in one or more mechanical properties over a nanocomposite with similar composition, but which is not produced by the process of the invention, for example a process where the base polyethylene resin and the planar carbon nanoparticles are dry-blended.

In one set of embodiments, the nanocomposite prepared by the process of the present invention has a tensile yield stress of at least 24 MPa when measured at 23° C. and a strain rate of 25 mm/min in accordance with ASTM D638. Preferably, the tensile strength is at least 24.5 MPa, or at least 25.0 or 25.5 MPa. In one embodiment, the nanocomposite has a tensile yield stress in the range of from about 24 to 35 MPa when measured at 23° C. and a strain rate of 25 mm/min in accordance with ASTM D638.

Without wishing to be limited by theory, it is believed that the planar carbon nanoparticles may act to reinforce the base polyethylene resin and thereby enhance one or more mechanical properties of the base resin. Properties that may be improved through the incorporation of planar carbon nanoparticles in the base polyethylene resin by the process of the invention may be selected from at least one of the following: modulus of elasticity, tensile yield stress, hoop stress rating, flexural modulus, UV resistance, and reduced rate of gas transmission. The present invention therefore allows a measurable enhancement in performance to be achieved without a significant or unacceptable loss of other desirable characteristics, such as tensile strength, ultimate elongation, melt index, thermal stability, impact strength, and slow crack growth resistance.

In one set of embodiments, the nanocomposite prepared by the process of the present invention provides an improvement in tensile yield stress of at least 3%, preferably at least 4%, more preferably at least 5%, most preferably at least 6%, over the base polyethylene resin alone, without an unacceptable loss of toughness or resistance to slow crack growth. Any loss of toughness may be reflected in results obtained for tensile strength at break, ultimate elongation and tensile impact strength.

In some embodiments, the nanocomposite prepared by the process of the invention exhibits a loss in tensile strength at break of no more than about 50%, preferably no more than about 40%, more preferably no more than about 30% relative to the base polyethylene resin alone.

A person skilled in the relevant art would appreciate that the ductility of a polymer composite, as reflected by the tensile strength and ultimate elongation, can provide an indicator of likely performance in Pennsylvania notch test (PENT) according to ASTM F1473 and charpy impact strength according to ISO179. Typically, a significant decrease in tensile strength and ultimate elongation will point to a reduction in material toughness and slow crack growth resistance.

In some embodiments, the nanocomposite produced by the process of the invention exhibits a loss of slow crack growth resistance of no more than 50% when compared to the base polyethylene resin alone, as indicated by the Pennsylvania notch test (PENT) and evaluated according to ASTM F1473 (whether the standard 10 mm specimen is notched with a standard notch depth of 3.5 mm or a non-standard notch depth of 5 mm). Preferably the loss of slow crack growth resistance is no more than 50%, more preferably no more than 40% when compared to the base polyethylene resin alone.

In some embodiments, specimens moulded from a nanocomposite prepared by the process of the invention have a slow crack growth resistance of at least 1000 hours, or at least 2000 hours, when tested following the procedure described in ASTM F-1473-97 (PENT test) at 80° C. in air and 2.4 MPa tensile stress, with a 10 mm thickness specimen and a standard notch depth of 3.5 mm.

In some embodiments, specimens moulded from a nanocomposite prepared by the process of the invention have a slow crack growth resistance of at least 1000 hours when measured according to ASTM F1473-97 at 80° C. in air, 2.4 MPa tensile stress, with a 10 mm thickness specimen and a non-standard notch depth of 5 mm.

In some embodiments, a nanocomposite prepared by the process of the invention has a slow crack growth resistance of at least 200 hours, preferably at least 400 hours, most preferably at least 600 hours when measured according to ASTM F1473-97 at 80° C. in air, 2.4 MPa tensile stress with a 10 mm thickness specimen, but with a non-standard notch depth of 5 mm and with the specimen continuously exposed to a surfactant mixture composed of 10 wt % polyoxyethylene nonylphenylether, 1 wt % sodium laureth sulphate and 1 wt % sodium xylenesulfonate mixed in water.

In some embodiments, the nanocomposite prepared by the process of the invention has a MRS of at least 10.0 MPa when evaluated according to ISO 9080 statistical procedures. In some embodiments, the nanocomposite has a MRS of at least 11.2 MPa, preferably at least 12.0 MPa, most preferably at least 12.5 MPa when evaluated according to ISO 9080 statistical procedures.

In some embodiments, the nanocomposite prepared by the process of the invention has a MRS that is at least 5%, preferably at least 10%, more preferably at least 20% greater than the MRS of the base polyethylene resin alone.

In some embodiments, the nanocomposite prepared by the process of the invention has, in pipe form, a Long Term Hydrostatic Stress (LTHS) that is at least 5%, preferably at least 10%, more preferably at least 20% greater than the LTHS of the base polyethylene resin alone.

Nanocomposites produced by the process of the invention also retain acceptable processing qualities while exhibiting improvements in strength and other mechanical properties.

Articles Comprising the Nanocomposite Prepared by the Process

In another aspect, the present invention also provides an article comprising, or formed from, a nanocomposite prepared by the process of the invention as described herein. Preferred articles may be containers or vessels, and pipes. In one set of embodiments, the article is a pressure vessel or a pipe.

In one set of embodiments, the article is a pipe. The pipe may be manufactured by conventional techniques, such as by extrusion. In one embodiment, the nanocomposite produced by the process of the invention is extruded to form a pressure pipe. The term "pressure pipe" as used herein is meant a pipe which, when used, is subjected to positive pressure, i.e. the pressure inside the pipe is higher than the pressure outside the pipe.

In another aspect, the present invention provides use of a nanocomposite prepared by the process of any one of the embodiments described herein in the manufacture of an article. In one set of embodiments, the article may be a pressure vessel or a pipe, preferably a pressure pipe.

Pipes comprising or formed with a nanocomposite prepared by the process of the invention exhibit improvements in one or more properties, when compared with a comparative pipe prepared with the same base polyethylene resin as used in the nanocomposite without the planar carbon nanoparticles, of from a nanocomposite of similar composition but which is prepared by a process not according to the invention.

In some embodiments, a pipe formed from a nanocomposite prepared by the process of the invention exhibits a time to failure of at least 200 hours, preferably at least 300 hours when tested according to ISO 1167 and subjected to a hoop stress of at least 14.0 MPa at 20° C. In some embodiments, the pipe exhibits a time to failure of at least 800 hours when tested according to ISO 1167 and subjected to a hoop stress of at least 13.75 MPa at 20° C. In some embodiments, the pipe exhibits a time to failure of at least 1200 hours, preferably at least 1500 hours when subjected to a hoop stress of at least 13.5 MPa at 20° C.

In some embodiments, a pipe formed from a nanocomposite prepared by the process of the invention exhibits a time to failure of at least 500 hours when evaluated according to the Notch Pipe Pressure Test (ISO 13479) at 920 kPa and 80° C. The pipe is typically evaluated as a 110 mm OD SDR11 pipe.

In one set of embodiments, a pipe comprising, or formed from, a nanocomposite prepared by the process of the invention exhibits a loss in resistance to slow crack growth of no more than 50%, when compared to a comparative pipe formed with the same base polyethylene resin without the planar carbon nanoparticles. Resistance to slow crack growth may be assessed using the Notched Pipe Pressure Test (ISO 13479), and is expressed in terms of time to failure in a hydrostatic pressure test of a pipe with machined longitudinal notches in the outside surface. The degree (%) of loss in slow crack growth resistance may be determined by assessing the results in slow crack growth afforded by a pipe formed from a nanocomposite prepared by the process of the invention over the performance exhibited by a comparative pipe formed from the base polyethylene resin alone.

Pipes comprising or formed from a nanocomposite prepared by the process of the invention advantageously do not suffer from an unacceptable loss in slow crack growth resistance, when compared to a comparative pipe formed with the same polyethylene resin without the planar carbon nanoparticles.

It is an advantage of the invention that articles such as pipes and more particularly, pressure pipes, prepared with a nanocomposite prepared by the process of the invention at least meet, and in some instances exceed, one or more minimum performance requirements prescribed by various international standards for PE100 pipe. For instance, pipes prepared with a nanocomposite prepared by the process of the invention may be able to withstand higher hoop stresses than conventional PE100 pipe at room temperature. Accordingly, the invention may be advantageous in the preparation of higher performance pipes and pressure vessels.

In some instances, pipes comprising, or formed from, a nanocomposite prepared by the process of the invention may meet or exceed one or more minimum performance requirements prescribed for PE100 pipe.

In other instances, pipes comprising, or formed from, a nanocomposite produced by the process of the invention may meet or exceed the pressure performance requirements prescribed for PE112 pipe.

In other instances, pipes comprising, or formed from, a nanocomposite prepared by the process of the invention may meet or exceed the pressure performance requirements prescribed for PE120 pipe.

In other instances, pipes comprising, or formed from, a nanocomposite prepared by the process of the invention may meet or exceed the pressure performance requirements prescribed for PE125 pipe.

The nanocomposite prepared by the process of the present invention advantageously enables high performance pressure pipes with one or more improved mechanical properties to be achieved without the need to alter the chemical composition of the base polyethylene resin. Improvements in mechanical properties are attributed to the presence of the planar carbon nanoparticles, which are dispersed in the base polymer resin, and provide reinforcement for the base polymer resin. The present invention therefore allows conventional base polyethylene resins to be used in pipe manufacture with one or more desirable pipe properties to be enhanced without significant loss of other properties, due to the presence of the nanoparticles. For example, it has been found that a pipe formed with a nanocomposite produced by the process of the invention and comprising a PE100 resin and planar carbon nanoparticles exhibited a load bearing performance, as shown by resistance to internal pressure, which exceeded that obtained for a comparative pipe prepared with the same PE100 resin alone.

While the above improvements have been described by reference to pipe products, one skilled in the relevant art would appreciate that the improvements afforded by the nanocomposite prepared by the process of the invention may also be applicable to a range of other manufactured products and articles.

EXAMPLES

The present invention is described with reference to the following examples. It is to be understood that the examples are illustrative of and not limiting to the invention described herein.

Materials

Exfoliated graphite nanoparticles (xGnP1) were sourced from XG Sciences (Grade C), with an average particle diameter of 2 microns, BET surface area of 500-550 m$^2$/g and carbon content of greater than 90% by mass of carbon.

Crystalline graphite was sourced from Asbury Carbons: Grade 3243 with an average particle diameter of 40 microns and BET surface area less than 20 m$^2$/g.

Exfoliated graphite nanoparticles (xGnP2) were manufactured using Hofmann's method to intercalate grade 3243 graphite with chemical reagents which was then exfoliated in a muffle furnace set at 1000° C. and purged with Argon gas. The xGnP2 nanoparticles are thermally reduced exfoliated graphite nanoparticles with an average particle diameter of less than 40 microns and BET surface area of 450-500 m$^2$/g.

Exfoliated graphite nanoparticles (xGnP3) were sourced from Asbury Carbon (grade 2299), with an average particle diameter of 3-6 microns, BET surface area of 400-450 m$^2$/g and carbon content of greater than 97% by mass of carbon.

Graphene oxide nanoparticles (GOnP1) were prepared by the following procedure. xGnP3 (5 g) was added to a mixture comprising 98% concentrated sulphuric acid (420 g), sodium nitrate (5 g), and potassium permanganate (15 g) at 0° C. The mixture was then stirred at 35° C. for 30 min, and then heated to 98° C. The mixture was added to deionized water (460 g) and stirred for 15 min. The mixture was observed to change from black to gold. A 30% solution of hydrogen peroxide (300 ml) was then added and stirred until no more effervescence was observed. The mixture was then washed with 5% dilute hydrochloric acid solution and deionized water several times. The upper layer of the solution was decanted and the residue was dried under vacuum to obtain graphene oxide nanoparticles.

PE100 resin, with the production parameters and properties shown in Table 1, was used as a base polyethylene resin. Different commercial batches of PE100 were used in different sets of experiments (designated batch A, batch B). PE100 batch A: MI$_5$ 0.38 g/10 min; HLMI 7.4 g/10 min; density 0.9545 g/cm$^3$. PE100 batch B: MI$_5$ 0.28 g/10 min; HLMI 8.4 g/10 min; density 0.9577 g/cm$^3$.

TABLE 1

Composition and properties of PE100

|  | Parameter | Units | Target | Normal Operating Range |
|---|---|---|---|---|
|  | Catalyst (Titanium) | mol | 12 | 10.0-14.0 |
|  | Batch size | kg | 20000 | 18000-22000 |
| Stage 1 | Nitrogen sparge | m$^3$ | 60 | 30-80 |
|  | Start temperature | ° C. | 74 | 70-80 |
|  | Prepoly addition | kg | 8800 | 7500-10000 |
|  | Prepoly gas rate | t/h | 3.5 | 3.0-5.0 |
|  | Comonomer addition | kg | 330 | 250-400 |
|  | Stage 1 temperature | ° C. | 80 | 75-85 |
| Stage 2 | Homo poly addition | kg | 11200 | 10000-12500 |
|  | Homo poly gas rate | t/h | 5.0 | 3.0-7.0 |
|  | Hydrogen Injection | kPa | 400 | 300-500 |
|  | Stage 2 temperature | ° C. | 85 | 80-90 |
| Properties | VZ | mL/g | 900 | 600-1100 |
|  | MI$_5$ pneumex reactor powder | g/10 min | 0.35 | 0.15-0.4 |
|  | MFR pneumex reactor powder | MI$_{21.6}$/MI$_5$ | 20 | 14-36 |
|  | Density | g/cm$^3$ | 0.954 | 0.950-0.960 |

Antioxidants (AO1010, AO168), calcium stearate, ethanol (96% purity) acetone and diethylether were used as supplied.

Example 1

Preparation of Nanocomposite According to the Invention, with Ethanol as the Inert Liquid xGnP1 was mixed with ethanol in a ratio of 1:2 based on the total dry volume of xGnP1 relative to the volume of ethanol. The mixture was sonicated with a point sonication device: Hielscher Ultrasound Technology, model UIP1000 with probe B2-1.4. Sonicator Power setting: Amplitude 80%, 1000 watts. Sonication Time: 60 minutes (cycle: 2 seconds On and 2 seconds Off).

Separately, PE100 resin (batch A) was tumble blended with the antioxidants and the calcium stearate for 2-3 minutes to give a blended powder mix.

The blended powder mix was added to the sonicated mixture of ethanol and xGnP1, and the combination was sonicated for 30 minutes (cycle: 2 seconds On and 2 seconds Off).

While heating the combination to 80° C. in a vacuum oven and stirring with a magnetic stirrer to maintain the PE and xGnP1 particles in suspension, the ethanol was removed to leave a substantially dry powder comprising a dispersion of the xGnP1 in the PE100 resin.

The dry powder was compounded in a ZSK25 twin screw compounder. The dry powder was fed into the compounder using a gravimetric feeder from the main hopper.

The compounder is schematically represented in FIG. 1. In FIG. 1 the letters A-Q represent specific screw elements detailed in Table 2.

TABLE 2

| Letter | Screw Element |
|---|---|
| A | 16/16 |
| B | 6 × 36/36 |
| C | 2 × KB45/5/36 |
| D | 6 × 36/36 |
| E | 24/24 |
| F | KB45/5/36 |
| G | KB45/5/24 |
| H | KB45/5/12 |
| I | 6 × 36/36 |
| J | 24/24 |
| K | KB45/5/24 |
| L | KB90/5/24 |
| M | 4 × 36/36 |
| N | 36/18 |
| O | 2 × 24/24 |
| P | SME 16/16 |
| Q | 2 × 16/16 |

All elements of the twin screw compounder were right-handed elements unless designated otherwise. For screw elements referred to in Table 2 the first number is the pitch, given in distance (mm) travelled in one revolution. The second number is the length of the element (mm).

"KB" indicates a kneading block. The first number is the angle formed by the paddles on the kneading block when compared to the line through the screw shaft, in degrees. The second number is how many paddles are on one element.

The third number is the length of the element (mm). "LH" indicates a left-handed element.

A processing temperature of at least 200° C. was used with specific energy input greater than 0.10 kWhr/kg. Details of the compounding conditions for the Example 1 composition are given in Table 3. The composition of nanocomposites formed by the process of Example 1 is shown in Table 4.

TABLE 3

Twin screw extruder settings and measured processing conditions.

|  | Units | Set Temperature | Example 1 Actual | Comparative Example 1 Actual |
|---|---|---|---|---|
| Zone 1 | ° C. | 170 | 167 | 148 |
| Zone 2 | ° C. | 190 | 183 | 163 |
| Zone 3 | ° C. | 190 | 190 | 192 |
| Zone 4 | ° C. | 190 | 190 | 194 |
| Zone 5 | ° C. | 200 | 193 | 196 |
| Zone 6 | ° C. | 200 | 201 | 200 |
| Zone 7 | ° C. | 210 | 211 | 210 |
| Zone 8 | ° C. | 210 | 211 | 210 |
| Zone 9 | ° C. | 210 | 210 | 211 |
| Zone 10 | ° C. | 220 | 220 | 216 |
| Zone 11 | ° C. | 220 | 220 | 219 |
| Melt Temp | ° C. | Not applicable | 219 | 218 |
| Melt Pressure | Bar | Not applicable | 14.6 | 16.8 |
| Rate | rpm | Not applicable | 10 | 10 |
| Torque | % | Not applicable | 47 | 47 |
| Screw Speed | rpm | 200 | 200 | 200 |
| Specific Energy | kWhr/kg | Not applicable | 0.31 | 0.34 |
| Pelletizer speed | rpm | 20 | 20 | 20 |

Example 2

Preparation of Nanocomposite According to the Invention, with Acetone as the Inert Liquid The procedure of Example 1 was followed, except that acetone was used instead of ethanol and the vacuum oven temperature was set to 60° C. The composition of nanocomposite formed by the process of Example 2 is shown in Table 4.

Example 3

Preparation of Nanocomposite According to the Invention, with Diethylether as the Inert Liquid The procedure of Example 1 was followed, except that diethylether was used instead of ethanol and the vacuum oven temperature was set to 40° C. The composition of nanocomposite formed by the process of Example 3 is shown in Table 4.

Comparative Example 1

Preparation of Comparative PE100

PE100 resin (batch A) was tumble blended with the antioxidants and the calcium stearate for 2-3 minutes to give a blended powder mix.

The dry powder was compounded in a ZSK25 twin screw compounder using the method described in Example 1. Details of the compounding conditions for the Comparative Example 1 composition are given in Table 3. The composition of PE100 formed by the process of Comparative Example 1 is shown in Table 4.

Comparative Example 2

Preparation of Nanocomposite by Means of a Dry Blending Process

PE100 resin (batch A) was tumble blended with xGnP1, the antioxidants and the calcium stearate for 2-3 minutes to give a dry blended powder mix.

The dry blended powder mix was compounded in a ZSK25 twin screw compounder using the method described in Example 1. The composition of nanocomposite formed by the process of Comparative Example 2 is shown in Table 4.

Comparative Example 3

Preparation of Graphite 3243 Composite, with Ethanol as the Inert Liquid

The procedure of Example 1 was followed, except that graphite 3243 was used instead of xGnP1. The composition of the composite formed by the process of Comparative Example 3 is shown in Table 4.

Example 4

Preparation of Nanocomposite According to the Invention, with Ethanol as the Inert Liquid The procedure of Example 1 was followed, except that xGnP3 was used instead of xGnP1, and PE 100 (batch B) was used instead of PE100 (batch A). The composition of the nanocomposite formed by the process of Example 4 is shown in Table 4.

Comparative Example 4

Preparation of Comparative PE100

The procedure of Comparative Example 1 was followed, except that PE100 resin (batch B) was used. The composition of PE100 formed by the process of Comparative Example 4 is shown in Table 4.

Comparative Example 5

Preparation of Graphene Oxide Nanocomposite, with Ethanol as the Inert Liquid

The procedure of Example 1 was followed, except that graphene oxide nanoparticles GOnP1 were used instead of xGnP1. The composition of the nanocomposite formed by the process of Comparative Example 5 is shown in Table 4.

TABLE 4

Compositions formed in Examples 1-4 and Comparative Examples 1-5.

| Example | Base polyethylene resin - PE100 (batch) | Base polyethylene resin - PE100 (wt %) | Filler | Filler (wt %) | Anti-oxidant (wt %) | Calcium stearate (wt %) |
|---|---|---|---|---|---|---|
| 1 | A | 94.5 | xGnP1 | 5 | 0.25 | 0.25 |
| 2 | A | 94.5 | xGnP1 | 5 | 0.25 | 0.25 |
| 3 | A | 94.5 | xGnP1 | 5 | 0.25 | 0.25 |
| CE1 | A | 99.5 | — | 0 | 0.25 | 0.25 |
| CE2 | A | 94.5 | xGnP1 | 5 | 0.25 | 0.25 |
| CE3 | A | 94.5 | Graphite | 5 | 0.25 | 0.25 |
| 4 | B | 94.5 | xGnP3 | 5 | 0.25 | 0.25 |
| CE4 | B | 99.5 | — | 0 | 0.25 | 0.25 |
| CE5 | B | 94.5 | GOnP1 | 5 | 0.25 | 0.25 |

Mechanical Properties:

The mechanical properties of the compositions of Table 4, produced by the process of the invention and by comparative processes, were evaluated using tensile testing at 23° C. at a strain rate of 25 mm/min in accordance with ASTM D638 in order to determine properties such as tensile yield stress and ultimate elongation. The results are shown in Table 5.

The change in tensile yield stress (% increase from control) provides an indication of potential improvement in MRS/long term hydrostatic strength for a polyethylene based composition, provided that slow crack resistance is maintained and there are no occurrences of brittle failures which curtail the MRS rating. From the results shown in Table 5 it can be seen that the nanocomposites prepared by the process of the invention, comprising PE100 resin and 5% (w/w) xGnP1 (Examples 1-3) provide an improvement in tensile yield stress of at least 7% over the PE100 control sample (Comparative Example 1). Notably, the nanocomposites produced by the process of the invention provide a greater improvement (7.6-8.8%) than the nanocomposite produced by the comparative dry-blending method (5.4%). Similarly, a nanocomposite prepared by the process of the invention, comprising PE100 resin and 5% (w/w) xGnP3 (Example 4) provided an improvement in tensile yield stress of 6% over the PE100 control sample (Comparative Example 4).

As also seen in Table 5, the presence of xGnP1 or xGnP3 in the composition results in a decrease in ultimate elongation. However, the loss in ultimate elongation is less than 20% for the nanocomposites relative to the PE100 control sample, which represents an acceptable loss of ductility. By contrast, a composite (Comparative Example 3) prepared by the process of the invention, but using graphite particles (lacking a nano-sized dimension) instead of planar carbon nanoparticles, lost 94% of its ultimate elongation. A nanocomposite (Comparative Example 5) prepared by the process of the invention, but using graphite oxide nanoparticles instead of planar carbon nanoparticles, lost 40% of its ultimate elongation.

TABLE 5

Mechanical properties of the compositions show in in Table 4.

| Example[a; b] | Average Tensile Yield Stress (MPa) | Tensile Yield Stress Standard deviation (MPa) | Change in Tensile Yield Stress relative to CE1/CE 4 (%) | Average Ultimate Elongation (%) | Ultimate Elongation Standard deviation (%) | Change in Ultimate Elongation relative to CE1/CE4 (%) |
|---|---|---|---|---|---|---|
| 1 | 25.8 | 0.2 | 8.4 | 686 | 24 | −14 |
| 2 | 25.6 | 0.1 | 7.6 | 660 | 33 | −17 |
| 3 | 25.6 | 0.1 | 7.6 | 661 | 27 | −17 |
| CE1 | 23.8 | 0.2 | — | 797 | 20 | — |
| CE2 | 25.1 | 0.1 | 5.4 | 666 | 36 | −16 |
| CE3 | 23.4 | 0.1 | −1.7 | 49 | 18 | −94 |
| 4 | 26.4 | 0.2 | 6.0 | 719 | 14 | −5 |
| CE4 | 25.0 | 0.1 | — | 753 | 18 | — |
| CE5 | 25.6 | 0.6 | 2.4 | 450 | 296 | −40 |

[a]Results from 5 repeat measurements.
[b]Examples 1-3 and Comparative Examples 1-3 used PE100 (batch A); Examples 4 and and Comparative Examples 4-5 used PE100 (batch B).

Slow Crack Growth Properties

Slow crack growth tests were performed using the standard ASTM F1473-13 test (PENT test), as well as a modified version thereof. The modifications were provided to accelerate the time to failure, which is a practical necessity when evaluating materials with very high resistance to slow crack growth, such as polyethylene materials designed for high MRS applications.

Compression molded specimens of 10 mm thickness were prepared from the nanocomposites prepared in Examples 1 and 2 and Comparative Examples 1 and 3. The specimens were notched with a either a 3.5 mm notch or a 5 mm notch (note: 5 mm is a non-standard notch depth in the ASTM method).

The 3.5 mm notched specimens were then subjected to the standard tensile loading procedure in air, according to the ASTM method. However, the 5 mm notched specimens was evaluated while immersed in a test medium consisting of a surface active non-ionic surfactant (detergent) solution. The results are shown in Table 6 below.

All of the samples exhibited a resistance to slow crack growth failure of greater than 3260 hours in the standard PENT test. In the accelerated test, where slow crack growth failures did occur within the test period, the nanocomposites prepared according to the invention (Examples 1 and 2) surprisingly gave failure times similar to those for the unfilled PE100 resin. By contrast, a composite prepared with graphite 3243 (which lacks a nanoscale particle dimension) exhibited a compromised resistance to slow crack growth.

TABLE 6

Slow crack growth results for the compositions show in in Table 4.

| Example | Failure time at 80° C., 2.4 MPa, 3.5 mm notch, in air (hours) | Failure time at 80° C., 2.4 MPa, 5.0 mm notch, mm notch, in surfactant solution (hours) |
|---|---|---|
| 1 | >3260 | 1069 |
| 2 | >3260 | 760 |
| CE1 | >3260 | 978 |
| CE3 | >3260 | 324 |

Impact Resistance Properties:

Tensile impact strength tests were performed using a room temperature (23° C.) charpy impact test according to ISO179. The results are shown in Table 7. This test may be used to estimate the relative impact resistances of pipes produced with the polyethylene based compositions. Nanocomposites containing 5% xGnP1 produced by the process of the invention (Examples 1-3) exhibited substantially higher impact resistance than a nanocomposite with similar composition but prepared by the comparative dry-blending method (Comparative Example 2). Furthermore, a composite produced with graphite particles instead of planar carbon nanoparticles (Comparative Example 3), but otherwise adopting the process of the invention, had even lower impact resistance than the dry-blended nanocomposite.

TABLE 7

Tensile impact strength results for the compositions show in in Table 4.

| Example | Average Tensile Impact Strength (kJ/m$^2$) | Tensile Impact Strength standard deviation (kJ/m$^2$) | Change in Tensile Impact Strength relative to CE2 (%) |
|---|---|---|---|
| 1 | 150 | 13 | 65 |
| 2 | 141 | 15 | 55 |
| 3 | 123 | 7 | 35 |
| CE2 | 91 | 12 | — |
| CE3 | 39 | 10 | −57 |

All test specimen widths were 3.11 mm.

Pipe Pressure Performance

The nanocomposite prepared according to Example 4 (ethanol as inert liquid; xGnP3 as planar carbon nanoparticles; PE100 as base polyethylene resin) was evaluated in pipe pressure performance tests. Comparative tests were conducted with unfilled PE100 according to Comparative Example 4.

Figure 2:
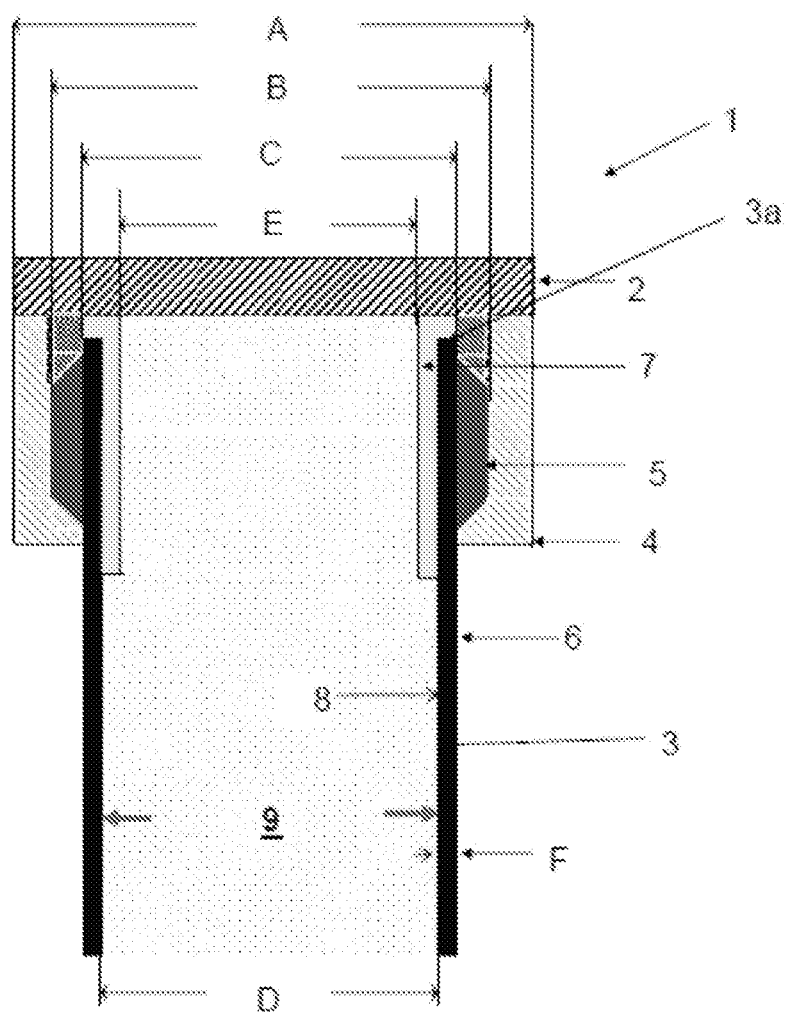
FIG. 2 is a schematic of the dimensions of the pipe sample that was pressured and the apparatus used to assess the pipe for hoop stress and resistance to internal pressure.

Pipes were moulded on a Battenfeld pipe extruder according to standard industry protocols to the dimensions required for testing as shown in FIG. 2 and described below. The pipe extruder settings, and actual conditions achieved for a representative pipe extruded from the nanocomposite, are detailed in Table 8.

TABLE 8

Pipe extruder settings.

| Extruder Conditions | Set Point | Actual value achieved |
|---|---|---|
| Zone 1 temperature (° C.) | 190 | 190 |
| Zone 2 temperature (° C.) | 200 | 196 |
| Zone 3 temperature (° C.) | 200 | 200 |
| Zone 4 temperature (° C.) | 200 | 200 |
| Adaptor temperature (° C.) | 210 | 210 |
| Die 1 temperature (° C.) | 210 | 210 |
| Die 2 temperature (° C.) | 210 | 210 |
| Die 3 temperature (° C.) | 200 | 200 |
| Die 4 temperature (° C.) | 210 | 210 |
| Melt temperature (° C.) | | 237 |
| Screw Speed (RPM) | | 49 |
| Motor Load (amps) | | 75.1 |
| Back pressure (bar) | | 201 |
| Line speed (m/min) | | 3.2 |
| Haul off gearbox | | 222 |
| Vacuum (MPa) | | 27 |
| Water temperature (° C.) | | 25 |

After conditioning for 24 hours, the test specimens were subjected to a specified constant internal hydrostatic pressure for a specified period of time or until failure in accordance with the method outlined in ISO 1167. The tests were conducted in triplicate.

FIG. 2 shows a schematic drawing of a test rig (1) used to assess hoop stress according to ISO1167. The test rig (1) comprises a threaded metal lid (2) of dimension (A) being 43.5 mm which retains a pipe sample (3) at one end (3a) of the pipe sample between:

(a) an assembly on the threaded metal lid (2) of external threaded metal ring (4) with internal rubber O-ring (olive) (5) with an external diameter (B) of 40 mm and an internal diameter (C) being 30.8 mm abutting the outer side (6) of the pipe sample (3); and (b) an internal plastic seal (thimble) (7) abutting the inside (8) of the pipe sample (2) having internal diameter (D) of 28.9 mm.

The plastic seal (7) has an internal diameter (E) of 20.5 mm. The pipe sample wall thickness (F) is 1.9 to 2.2 mm.

The hoop stress testing is carried out by subjecting the lumen (9) of the pipe sample (3) to hydrostatic pressure.

The results in Table 9 show the measured minimum and maximum times to failure of pipe extruded from the nanocomposite prepared according to Example 1, and from the base polyethylene resin, under a range of different temperature and pressure conditions. The data is compared against the lower prediction limit (LPL) values of compositions with a minimum required strength of 12.0 and 12.5 MPa (i.e. produced with theoretical PE120 and PE125 resins), according to the extrapolation methodology of ISO 9080 statistical procedures. The LPL is the minimum time to failure for three specimens of the same sample at a given temperature and stress, predicted with a 97.5% confidence.

It may be seen that the pipe pressure performance of the nanocomposite prepared according to the process of the invention (in Example 4) is substantially improved relative to that of its constituent PE100 base resin (as formulated in Comparative Example 4).

Furthermore, the nanocomposite prepared according to the process of the invention exceeds the benchmark for theoretical PE120 in all tests, though it falls short of the requirements of theoretical PE125.

TABLE 9

Test data for pipe extruded from nanocomposite prepared by the process of the invention and for pipe extruded from PE100 resin, compared against the theoretical performance of pipe extruded from PE120 and PE125 resin.

| Composition from Example | Test Temp (° C.) | Pipe stress (MPa) | Min failure time (h) | Max Failure time (h) | PE120 LPL (h) | PE125 LPL (h) |
|---|---|---|---|---|---|---|
| 4 | 20 | 14.25 | 166 | 245 | 58 | 444 |
| 4 | 20 | 14.00 | 368 | 861 | 159 | 1213 |
| 4 | 20 | 13.75 | 1149 | >5000 | 445 | 3372 |
| 4 | 20 | 13.50 | 1675 | >5000 | 1268 | 9556 |
| 4 | 80 | 7.25 | 95 | 216 | 71 | 276 |
| 4 | 80 | 7.00 | 482 | 1811 | 231 | 915 |
| 4 | 80 | 6.75 | 1303 | >5000 | 786 | 3172 |
| CE4 | 20 | 14.00 | <20 | <20 | 159 | 1213 |
| CE4 | 80 | 7.00 | <20 | <20 | 231 | 915 |

Total Dry Volume/Bulk Density Investigations:

Following the method described in Example 1, dispersions of xGnP2 in PE100 base resin (2 wt % xGnP2 and 3 wt % xGnP2 in PE100) were prepared by mixing the xGnP2 and PE together in ethanol, and removing the ethanol while mixing at 80° C. The total dry volume of these dry powder compositions was measured, and the bulk density calculated. The results are shown in Table 10.

Following the method described in Comparative Example 2, a blend of xGnP2 in PE100 base resin (2 wt % xGnP2 in PE100) was prepared by tumble mixing the two components. The total dry volume of this powder composition was measured, and the bulk density calculated. The results are also shown in Table 10.

Figure 3:
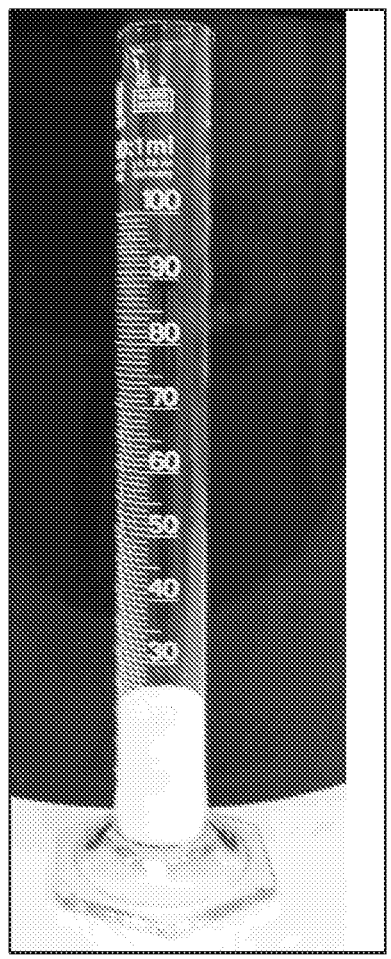
FIG. 3 depicts photographs of a PE100 base polyethylene resin and exfoliated graphite planar carbon nanoparticles used to prepare a 2 weight % nanoparticle nanocomposite in accordance with the invention.
Figure 3:
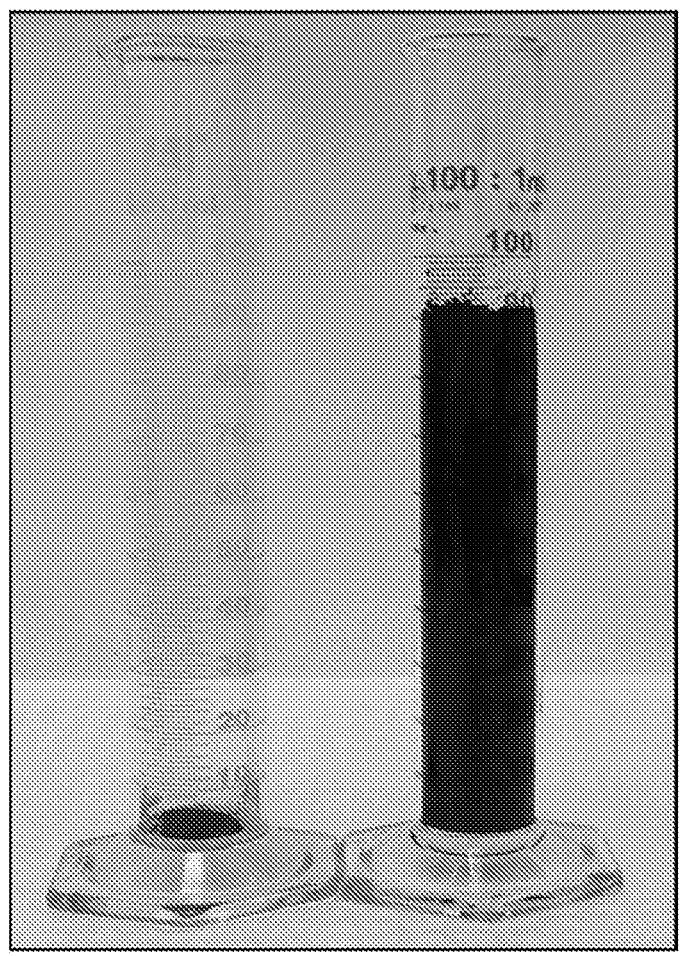

The total dry volume of known masses of PE100 powder and xGnP2 were measured, and the bulk densities calculated. The results are shown in Table 10, and the materials in relative proportion for the preparation of the 2 weight % nanocomposites are depicted in FIG. 3. FIG. 3a shows 10 g of PE100, while FIG. 3c shows 0.2 g of xGnP2 planar carbon nanoparticles (which may be compared against 0.2 g of carbon black in FIG. 3b). The extremely low bulk density of the planar carbon nanoparticles is evident. As a result of the low bulk density, the total dry volume of the planar carbon nanoparticles is considerably higher than that of the polyethylene base resin, despite the relative mass being only 2%. The method of the invention allows these materials of very different bulk densities to be uniformly dispersed.

Furthermore, it can be seen from Table 10 that the compositions prepared according to the process of the invention have a bulk density that is not substantially lower than that of the PE100 base resin, notwithstanding the extremely low bulk density of the xGnP2 component. As such, the composition may be subsequently processed, for example in a melt compounder or extruder, in a similar manner and without substantial loss of throughput compared to the processing steps conventionally performed with the PE100 base resin.

By contrast, the composition prepared by dry-blending the PE100 and xGnP2 has a substantially reduced bulk density compared to that of the PE100 base resin, and was visually inhomogeneous despite the tumble-blending. As a result, the subsequent processing of the composition may be adversely affected, resulting in reduced throughput or the need for modified process equipment.

TABLE 10

Total dry volume and bulk density of PE100, xGnP2 and mixtures of PE100 and xGnP2.

| PE100 (g) | xGnP2 (g) | Method applied | Total Dry Volume (ml) | Bulk density (g/cm$^3$) | Loss of bulk density relative to PE100 (%) |
|---|---|---|---|---|---|
| 0 | 2.0 | As supplied | 702 | 0.0028 | |
| 0 | 3.0 | As supplied | 1065 | 0.0028 | |
| 100 | 0 | As supplied | 226 | 0.442 | |
| 100 | 2.0 | Example 1 (according to the invention) | 262 | 0.389 | 12 |
| 100 | 3.0 | Example 1 (according to the invention) | 286 | 0.360 | 19 |
| 100 | 2.0 | Comparative Example 2 (dry blending) | 837 | 0.122 | 72 |

Analysis of the Experimental Data

The experimental data shows that, by employing the process of the invention, a polyethylene nanocomposite material with a favourable balance of properties may be obtained.

Polyethylene nanocomposites were prepared in accordance with the process of the invention using ethanol, acetone and diethylether as the inert liquid (Examples 1, 2 and 3 respectively), and using two different planar carbon nanoparticles (Examples 1 and 4). The tensile yield stresses of these nanocomposites were found to be substantially improved relative to their PE100 base resins (Comparative Examples 1 and 4). Moreover, the tensile yield stress of the nanocomposites prepared according to the invention is greater than that obtained for a nanocomposite of similar composition but prepared according to a comparative dry-blending process (Comparative Example 2).

Comparative materials prepared with graphite particles lacking a nano-scale dimension (Comparative Example 3) or graphene oxide nanoparticles (Comparative Example 5), gave inferior tensile yield stresses compared with the nanocomposites prepared with exfoliated graphite nanoparticles used in the examples according to the invention, even though the method of the invention was otherwise followed. This demonstrates the importance of using planar carbon nanoparticles to obtain an advantageous balance of properties.

Surprisingly, the advantageous improvement in strength obtained when preparing nanocomposites according to the method of the invention is not accompanied by an unacceptable reduction in the ductility of the material. The ultimate elongation of the nanocomposites prepared according to the process of the invention in Examples 1, 2, 3 and 4 is only between 5 and 17% less than the ultimate elongation of the constituent PE100 base resin (Comparative Examples 1 and 4) respectively. By contrast, the ductility of the material prepared with graphite particles (Comparative Example 3) and graphene oxide particles (Comparative Example 5) was substantially compromised relative to the base resin, as reflected by the loss in ultimate elongation of 94% and 40% respectively. In the case of the graphene oxide nanoparticles, it is hypothesized that the loss of ductility reflects the poor compatibility between the hydrophilic oxidised nanoparticles and the hydrophobic base polyethylene resin.

Moreover, the improvement in strength was also not achieved at the expense of an unacceptable loss of resistance to slow crack growth. Nanocomposites prepared according to the invention (Examples 1 and 2) surprisingly gave failure times similar to those for the unfilled PE100 resin (Comparative Example 1). By contrast, a composite prepared with graphite 3243 (Comparative Example 3) exhibited a compromised resistance to slow crack growth in line with previous expectations for the effect of fillers on increased propensity for brittle failures.

Furthermore, the impact resistance of the nanocomposites prepared by the process of the invention (Examples 1-3) was found to be substantially higher than that of the nanocomposite of similar composition, but prepared with a comparative dry-blending process (Comparative Example 2), and that of the composite prepared by the same method, but using graphite particles instead of planar carbon nanoparticles (Comparative Example 3).

As a result of these features, a nanocomposite produced by the method of the invention (Example 4) may be extruded into a pipe which offers a significant improvement in resistance to internal pressure relative to a pipe extruded from the base resin (Comparative Example 4). In particular, when using a PE100-based nanocomposite with only 5% planar carbon nanoparticles filler, the time to failure of pipes tested at high hoop stresses at 20° C. and 80° C. exceeds the expected performance of a theoretical PE120 resin.

A person skilled in the art will appreciate that these excellent pipe pressure performance data indicate that the nanocomposite prepared according to the invention has an enhanced tensile yield stress relative to PE100 base resin while retaining a sufficient degree of the excellent resistance to slow crack growth inherent in the resin. Notably, surpassing the LPL for theoretical PE120 at 80° C. would not be possible unless a material exhibited excellent resistance to slow crack growth, as brittle failures caused by slow crack growth are accelerated at high temperatures, becoming the dominant mechanism of failure for materials with low resistance to slow crack growth.

A further advantage of the invention is that the process of the invention provides an improved means for combining the polyethylene and base resin and the planar carbon nanoparticles, notwithstanding the extremely low bulk density of the planar carbon nanoparticles component as supplied. Moreover, the compositions prepared according to the process of the invention may have a bulk density that is not substantially lower than that of the PE100 base resin. Compositions produced according to the process of the invention with 2 and 3 weight % exfoliated graphene nanoparticles had a bulk density of 0.389 g/cm$^3$ and 0.360 g/cm$^3$ respectively, only a relatively minor reduction relative to the bulk density of the base polyethylene resin itself, 0.442 g/cm$^3$, despite the xGnP2 bulk density being only 0.0028 g/cm$^3$. As such, the nanocomposite prepared by the process of the invention may be subsequently processed, for example in a melt compounder or extruder, in a similar manner and without substantial loss of throughput compared to the processing steps conventionally performed with the PE100 base resin.

By contrast, a composition containing 2 weight % exfoliated graphene nanoparticles prepared by dry-blending the PE100 and the nanoparticles has a substantially reduced bulk density of 0.122 g/cm$^3$, and was visually inhomogeneous despite the tumble-blending. As a result, the subsequent processing of such compositions may be adversely affected, resulting in reduced throughput or the need for modified process equipment.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A process for preparation of a polyethylene nanocomposite comprising:
   providing a base polyethylene resin in the form of a particulate solid,
   providing planar carbon nanoparticles selected from the group consisting of graphene, graphite, reduced graphene oxide, exfoliated graphite nanoparticles, and mixtures thereof,
   dispersing each of the base polyethylene resin and the planar carbon nanoparticles in an inert liquid selected from the group consisting of alcohols, ethers, ketones, esters, nitriles, alkanes and mixtures thereof, at conditions under which the base polyethylene resin is not solubilised in the inert liquid to provide a dispersion comprising at least the polyethylene resin and planar carbon nanoparticles,
   optionally removing all inert liquid from the dispersion to form a mixture of the polyethylene resin and planar carbon nanoparticles, and
   melt compounding either (i) the dispersion, whereby the inert liquid is removed from the dispersion during said melt compounding, or (ii) the mixture when said removing is carried out prior to said melt compounding, wherein said melt compounding forms the polyethylene nanocomposite, and
   wherein the planar carbon nanoparticles are provided in an amount of from 5% to 70% by weight of the polyethylene nanocomposite.

2. The process according to claim 1, wherein the inert liquid is removed such that no more than 5% by weight of the inert liquid remains prior to melt compounding.

3. The process according to claim 1, wherein the total volume of inert liquid used is at least equal to the total dry volume of the planar carbon nanoparticles.

4. The process according to claim 1, wherein the inert liquid is selected from the group consisting of ethanol, acetone, diethylether, ethylacetate, acetonitrile, isopropanol, methylacetate, isopropyl acetate, methanol and mixtures thereof.

5. The process according to claim 1, wherein the planar carbon nanoparticles are first dispersed in the inert liquid and the base polyethylene resin is added to the dispersion of the planar carbon nanoparticles in the inert liquid.

6. The process according to claim 1, wherein said dispersing is carried by a technique selected from the group consisting of mechanical mixing, sonication, and bubble-induced turbulence.

7. The process according to claim 1, wherein the planar carbon nanoparticles have a BET surface area of at least 200 m$^2$/g.

8. The process according to claim 1, wherein the planar carbon nanoparticles have a BET surface area of from 400 to 1000 m$^2$/g.

9. The process according to claim 1, wherein the planar carbon nanoparticles are exfoliated graphite or reduced graphene oxide nanoparticles.

10. The process according to claim 1, wherein the base polyethylene resin is medium density polyethylene or high density polyethylene.

11. The process according to claim 1, wherein the base polyethylene resin has a Minimum Required Strength of at least 10 MPa.

12. The process according to claim 1, wherein the base polyethylene resin has a slow crack growth resistance of at least 1000 hours when measured according to ASTM F1473-97 at 80° C. in air, 2.4 MPa tensile stress with a 10 mm thickness specimen and a standard notch depth of 3.5 mm.

13. The process according to claim 1, wherein the planar carbon nanoparticles are provided in an amount of from 10% to 70% by weight of the polyethylene nanocomposite.

14. The process according to claim 1, wherein the planar carbon nanoparticles are provided in an amount of from 20% to 70% by weight of the polyethylene nanocomposite.

15. The process according to claim 1, wherein the planar carbon nanoparticles are provided in an amount of from 20% to 50% by weight of the polyethylene nanocomposite.

16. A process for preparation of a polyethylene nanocomposite comprising:
providing a base polyethylene resin in the form of a particulate solid, wherein the base polyethylene resin has a melt flow index in the range of from 0.10 to 0.9 g/10 min at 190° C. and 5 kg as measured according to ISO 1133, a high load melt flow index of from 2 to 20 g/10 min at 190° C. and 21.6 kg as measured according to ISO 1133, and a density in the range of from about 0.930 to about 0.970 g/cm$^3$ at 23° C. as measured according to ASTM D792,
providing planar carbon nanoparticles selected from the group consisting of graphene, graphite, reduced graphene oxide, exfoliated graphite nanoparticles, and mixtures thereof,
dispersing each of the base polyethylene resin and the planar carbon nanoparticles in an inert liquid selected from the group consisting of alcohols, ethers, ketones, esters, nitriles, alkanes and mixtures thereof, at conditions under which the base polyethylene resin is not solubilised in the inert liquid to provide a dispersion comprising at least the polyethylene resin and planar carbon nanoparticles,
optionally removing all inert liquid from the dispersion to form a mixture of the polyethylene resin and planar carbon nanoparticles, and
melt compounding either (i) the dispersion, whereby the inert liquid is removed from the dispersion during said melt compounding, or (ii) the mixture when said removing is carried out prior to said melt compounding, wherein said melt compounding forms the polyethylene nanocomposite.

17. A process for preparation of a polyethylene nanocomposite comprising:
providing a base polyethylene resin in the form of a particulate solid, wherein the base polyethylene resin has a multimodal molecular weight distribution and comprises at least one alpha-olefinic co-monomer incorporated into a high molecular weight fraction of the polyethylene resin to achieve from 0.5% to 8% by weight of the high molecular weight fraction,
providing planar carbon nanoparticles selected from the group consisting of graphene, graphite, reduced graphene oxide, exfoliated graphite nanoparticles, and mixtures thereof,
dispersing each of the base polyethylene resin and the planar carbon nanoparticles in an inert liquid selected from the group consisting of alcohols, ethers, ketones, esters, nitriles, alkanes and mixtures thereof, at conditions under which the base polyethylene resin is not solubilised in the inert liquid to provide a dispersion comprising at least the polyethylene resin and planar carbon nanoparticles,
optionally removing all inert liquid from the dispersion to form a mixture of the polyethylene resin and planar carbon nanoparticles, and
melt compounding either (i) the dispersion, whereby the inert liquid is removed from the dispersion during said melt compounding, or (ii) the mixture when said removing is carried out prior to said melt compounding, wherein said melt compounding forms the polyethylene nanocomposite.

18. A method of fabricating a pipe formed of a polyethylene nanocomposite, the method comprising:
providing a polyethylene nanocomposite prepared according to the process of claim 1; and
extruding the melted polyethylene nanocomposite to form a pipe.

19. A method of fabricating a pipe formed of a polyethylene nanocomposite, the method comprising:
providing a polyethylene nanocomposite prepared according to the process of claim 16; and
extruding the melted polyethylene nanocomposite to form a pipe.

20. A method of fabricating a pipe formed of a polyethylene nanocomposite, the method comprising:
providing a polyethylene nanocomposite prepared according to the process of claim 17; and
extruding the melted polyethylene nanocomposite to form a pipe.

* * * * *